US009149748B2

(12) United States Patent
Nagy et al.

(10) Patent No.: US 9,149,748 B2
(45) Date of Patent: Oct. 6, 2015

(54) MULTI-LAYERED FILTER MEDIA

(71) Applicant: Hollingsworth & Vose Company, East Walpole, MA (US)

(72) Inventors: Máté Nagy, Floyd, VA (US); Sven Siegle, Frankenberg (DE)

(73) Assignee: Hollingsworth & Vose Company, East Walpole, MA (US)

( * ) Notice: Subject to any disclaimer, the term of this patent is extended or adjusted under 35 U.S.C. 154(b) by 121 days.

(21) Appl. No.: 13/775,420

(22) Filed: Feb. 25, 2013

(65) Prior Publication Data

US 2014/0130469 A1   May 15, 2014

Related U.S. Application Data

(63) Continuation-in-part of application No. 13/675,514, filed on Nov. 13, 2012, now abandoned.

(51) Int. Cl.
*B01D 39/16* (2006.01)
*B01D 39/18* (2006.01)

(52) U.S. Cl.
CPC ........ *B01D 39/1607* (2013.01); *B01D 39/1615* (2013.01); *B01D 39/1623* (2013.01); *B01D 39/18* (2013.01); *B01D 2239/065* (2013.01); *B01D 2239/0654* (2013.01); *B01D 2275/10* (2013.01)

(58) Field of Classification Search
CPC ............... B01D 2275/10; B01D 39/18; B01D 2239/065; B01D 2239/0654
USPC .................................. 55/486, 487, 527, 528
See application file for complete search history.

(56) References Cited

U.S. PATENT DOCUMENTS

| | | |
|---|---|---|
| 3,645,398 A | 2/1972 | Fiocco |
| 3,847,821 A | 11/1974 | Krueger |
| 3,865,732 A | 2/1975 | Terhune et al. |
| 3,943,063 A | 3/1976 | Morishita et al. |
| 3,951,814 A | 4/1976 | Krueger |
| 4,199,447 A | 4/1980 | Chambers et al. |
| 4,468,428 A | 8/1984 | Early et al. |
| 4,501,785 A | 2/1985 | Nakanishi |

(Continued)

FOREIGN PATENT DOCUMENTS

| | | |
|---|---|---|
| CN | 1016355 B | 4/1992 |
| CN | 2393623 Y | 8/2000 |

(Continued)

OTHER PUBLICATIONS

International Search Report and Written Opinion for PCT/US2014/017979 mailed May 21, 2014.

*Primary Examiner* — Robert Clemente
(74) *Attorney, Agent, or Firm* — Wolf, Greenfield & Sacks, P.C.

(57) ABSTRACT

Fiber webs that may be used as filter media are provided. In some embodiments, the filter media may include multiple layers. Each layer may be designed to have separate functions in the filter media. For example, a first layer may be provided for improving dust holding capacity, a second layer for improving efficiency, and a third layer for providing support and strength to the media. By designing the layers to have separate functions, each layer may be optimized to enhance its function without negatively impacting the performance of another layer of the media.

98 Claims, 5 Drawing Sheets

(56) References Cited

U.S. PATENT DOCUMENTS

| | | |
|---|---|---|
| 4,588,500 A | 5/1986 | Sprenger et al. |
| 4,604,205 A | 8/1986 | Ayers |
| 4,618,388 A | 10/1986 | Ayers |
| 4,623,560 A | 11/1986 | Ayers |
| 4,650,506 A * | 3/1987 | Barris et al. .............. 55/487 |
| 4,888,117 A | 12/1989 | Brown et al. |
| 4,892,667 A | 1/1990 | Parker, III et al. |
| 4,921,612 A | 5/1990 | Sirkar |
| 4,995,974 A | 2/1991 | Lorey et al. |
| 5,053,132 A | 10/1991 | Sirkar |
| 5,156,905 A | 10/1992 | Bagrodia et al. |
| 5,275,859 A | 1/1994 | Phillips et al. |
| 5,294,338 A | 3/1994 | Kamo et al. |
| 5,356,704 A | 10/1994 | Phillips et al. |
| 5,443,724 A | 8/1995 | Williamson et al. |
| 5,480,547 A | 1/1996 | Williamson et al. |
| 5,503,746 A | 4/1996 | Gagnon |
| 5,547,756 A | 8/1996 | Kamo et al. |
| 5,580,459 A | 12/1996 | Powers et al. |
| 5,580,692 A | 12/1996 | Lofftus et al. |
| 5,629,367 A | 5/1997 | Lofftus et al. |
| 5,672,399 A | 9/1997 | Kahlbaugh et al. |
| 5,785,725 A | 7/1998 | Cusick et al. |
| 6,123,752 A | 9/2000 | Wu et al. |
| 6,171,684 B1 | 1/2001 | Kahlbaugh et al. |
| 6,224,768 B1 | 5/2001 | Navarre et al. |
| 6,395,184 B1 | 5/2002 | Bukhtiyarov et al. |
| 6,422,395 B1 | 7/2002 | Verdegan et al. |
| 6,422,396 B1 | 7/2002 | Li et al. |
| 6,537,614 B1 | 3/2003 | Wei et al. |
| 6,554,881 B1 | 4/2003 | Healey |
| 6,569,330 B1 | 5/2003 | Sprenger et al. |
| 6,616,723 B2 | 9/2003 | Berger |
| 6,696,373 B2 | 2/2004 | Kinn et al. |
| 6,743,273 B2 | 6/2004 | Chung et al. |
| 6,802,315 B2 | 10/2004 | Gahan et al. |
| 6,855,173 B2 | 2/2005 | Ehrnsperger et al. |
| 6,914,040 B2 | 7/2005 | Deak et al. |
| 6,924,028 B2 | 8/2005 | Chung et al. |
| 6,955,775 B2 | 10/2005 | Chung et al. |
| 7,008,465 B2 | 3/2006 | Graham et al. |
| 7,070,640 B2 | 7/2006 | Chung et al. |
| 7,084,099 B2 | 8/2006 | Radomyselski et al. |
| 7,090,715 B2 | 8/2006 | Chung et al. |
| 7,137,510 B1 | 11/2006 | Klein et al. |
| 7,179,317 B2 | 2/2007 | Chung et al. |
| 7,241,728 B2 | 7/2007 | Radomyselski et al. |
| 7,244,291 B2 | 7/2007 | Spartz et al. |
| 7,258,797 B2 | 8/2007 | Burton et al. |
| 7,270,693 B2 | 9/2007 | Chung et al. |
| 7,309,372 B2 | 12/2007 | Kahlbaugh et al. |
| 7,314,497 B2 | 1/2008 | Kahlbaugh et al. |
| 7,316,723 B2 | 1/2008 | Chung et al. |
| 7,318,852 B2 | 1/2008 | Chung et al. |
| 7,318,853 B2 | 1/2008 | Chung et al. |
| 7,413,657 B1 | 8/2008 | Thundyil et al. |
| 7,527,739 B2 | 5/2009 | Jiang et al. |
| 7,584,860 B2 | 9/2009 | Olson |
| 7,754,123 B2 | 7/2010 | Verdegan et al. |
| 7,824,550 B2 | 11/2010 | Abreu et al. |
| 7,887,704 B2 | 2/2011 | Jiang et al. |
| 7,938,963 B2 | 5/2011 | Klein et al. |
| 7,985,344 B2 | 7/2011 | Dema et al. |
| 7,987,996 B2 | 8/2011 | Ohashi et al. |
| 7,988,860 B2 | 8/2011 | Kalayci et al. |
| 8,017,011 B2 | 9/2011 | Ellis et al. |
| 8,021,455 B2 | 9/2011 | Adamek et al. |
| 8,021,457 B2 | 9/2011 | Dema et al. |
| 8,029,588 B2 | 10/2011 | Chung et al. |
| 8,057,567 B2 | 11/2011 | Webb et al. |
| 8,114,183 B2 | 2/2012 | Schwandt et al. |
| 8,118,901 B2 | 2/2012 | Chung et al. |
| 8,118,910 B2 | 2/2012 | Farzana et al. |
| 8,172,092 B2 | 5/2012 | Green et al. |
| 8,177,984 B2 | 5/2012 | Stanfel et al. |
| 8,263,214 B2 | 9/2012 | Kalayci et al. |
| 8,268,033 B2 | 9/2012 | Rogers et al. |
| 8,277,529 B2 | 10/2012 | Rogers et al. |
| 8,360,251 B2 | 1/2013 | Wieczorek et al. |
| 8,366,797 B2 | 2/2013 | Chung et al. |
| 8,517,185 B2 | 8/2013 | Wieczorek et al. |
| 8,535,404 B2 | 9/2013 | Crabtree et al. |
| 8,636,833 B2 | 1/2014 | Jones et al. |
| 2002/0056684 A1 | 5/2002 | Klein |
| 2002/0073849 A1 | 6/2002 | Buettner et al. |
| 2003/0203696 A1 | 10/2003 | Healey |
| 2005/0026526 A1 | 2/2005 | Verdegan et al. |
| 2006/0117730 A1 | 6/2006 | Chung et al. |
| 2006/0137318 A1* | 6/2006 | Lim et al. .............. 55/528 |
| 2006/0191249 A1 | 8/2006 | Gogins et al. |
| 2007/0012007 A1 | 1/2007 | Chung et al. |
| 2007/0039300 A1 | 2/2007 | Kahlbaugh et al. |
| 2007/0062887 A1 | 3/2007 | Schwandt et al. |
| 2007/0084776 A1 | 4/2007 | Sasur |
| 2007/0102372 A1 | 5/2007 | Ferrer et al. |
| 2007/0271883 A1 | 11/2007 | Chung et al. |
| 2007/0271891 A1 | 11/2007 | Chung et al. |
| 2007/0283808 A1 | 12/2007 | Chung et al. |
| 2008/0033106 A1 | 2/2008 | Koroskenyi et al. |
| 2008/0073296 A1 | 3/2008 | Dema et al. |
| 2008/0110822 A1 | 5/2008 | Chung et al. |
| 2008/0197070 A1 | 8/2008 | Sirkar et al. |
| 2008/0257153 A1 | 10/2008 | Harp |
| 2008/0276805 A1 | 11/2008 | Lotgerink |
| 2008/0314821 A1 | 12/2008 | Ohashi et al. |
| 2009/0032475 A1 | 2/2009 | Ferrer et al. |
| 2009/0044702 A1 | 2/2009 | Adamek et al. |
| 2009/0050578 A1 | 2/2009 | Israel et al. |
| 2009/0065436 A1 | 3/2009 | Kalayci et al. |
| 2009/0134068 A1 | 5/2009 | Falkiner et al. |
| 2009/0178970 A1 | 7/2009 | Stanfel et al. |
| 2009/0317621 A1 | 12/2009 | Youngblood et al. |
| 2010/0006494 A1 | 1/2010 | Scher et al. |
| 2010/0050871 A1 | 3/2010 | Moy et al. |
| 2010/0064645 A1 | 3/2010 | Chung et al. |
| 2010/0116138 A1 | 5/2010 | Guimond et al. |
| 2010/0116751 A1 | 5/2010 | Bajpai et al. |
| 2010/0200512 A1 | 8/2010 | Chase et al. |
| 2010/0206800 A1 | 8/2010 | Veit et al. |
| 2010/0285101 A1 | 11/2010 | Moore et al. |
| 2010/0307119 A1 | 12/2010 | Leung et al. |
| 2011/0006017 A1 | 1/2011 | Wieczorek et al. |
| 2011/0067369 A1 | 3/2011 | Chung et al. |
| 2011/0084028 A1 | 4/2011 | Stanfel et al. |
| 2011/0089101 A1 | 4/2011 | Girondi |
| 2011/0124941 A1 | 5/2011 | Verdegan et al. |
| 2011/0138685 A1 | 6/2011 | Kalayci et al. |
| 2011/0147299 A1 | 6/2011 | Stanfel et al. |
| 2011/0168622 A1 | 7/2011 | Lucas |
| 2011/0168647 A1 | 7/2011 | Wieczorek et al. |
| 2011/0198280 A1 | 8/2011 | Jones et al. |
| 2011/0209619 A1 | 9/2011 | Lazarevic et al. |
| 2011/0210061 A1 | 9/2011 | Li et al. |
| 2011/0215046 A1 | 9/2011 | Rogers et al. |
| 2011/0233152 A1 | 9/2011 | Wieczorek et al. |
| 2011/0238026 A1 | 9/2011 | Zhang et al. |
| 2011/0259796 A1 | 10/2011 | Chen et al. |
| 2011/0259813 A1 | 10/2011 | Wertz et al. |
| 2011/0309012 A1 | 12/2011 | Rogers et al. |
| 2012/0043281 A1 | 2/2012 | Stanfel et al. |
| 2012/0067220 A1 | 3/2012 | Velpari et al. |
| 2012/0067814 A1 | 3/2012 | Guimond et al. |
| 2012/0204527 A1 | 8/2012 | Chung et al. |
| 2012/0234748 A1 | 9/2012 | Little et al. |
| 2012/0261330 A1 | 10/2012 | Stanfel et al. |
| 2012/0261358 A1 | 10/2012 | Stanfel et al. |
| 2012/0292252 A1 | 11/2012 | Chase et al. |
| 2012/0312734 A1 | 12/2012 | Kalayci et al. |
| 2012/0312738 A1 | 12/2012 | Rogers et al. |
| 2013/0001154 A1 | 1/2013 | Chung et al. |
| 2013/0001155 A1 | 1/2013 | Neubauer et al. |
| 2013/0008006 A1 | 1/2013 | Israel et al. |
| 2013/0008846 A1 | 1/2013 | Rogers et al. |
| 2013/0008853 A1 | 1/2013 | Dallas et al. |

(56) References Cited

U.S. PATENT DOCUMENTS

| | | |
|---|---|---|
| 2013/0264276 A1 | 10/2013 | Corn et al. |
| 2014/0034580 A1 | 2/2014 | Chen |
| 2014/0110354 A1 | 4/2014 | Haberkamp et al. |
| 2014/0275692 A1 | 9/2014 | Patel et al. |
| 2014/0331626 A1 | 11/2014 | Nagy et al. |

FOREIGN PATENT DOCUMENTS

| | | |
|---|---|---|
| CN | 1150445 C | 5/2004 |
| CN | 1954993 A | 5/2007 |
| CN | 101156998 A | 4/2008 |
| CN | 101967390 A | 2/2011 |
| CN | 102046261 A | 5/2011 |
| CN | 102421583 A | 4/2012 |
| CN | 103025404 A | 4/2013 |
| DE | 32 15 161 C1 | 12/1983 |
| DE | 102010031842 A1 | 1/2012 |
| DE | 102010031843 A1 | 1/2012 |
| DE | 102012010307 A1 | 11/2013 |
| EP | 0 203 703 A1 | 12/1986 |
| EP | 1 201 286 A1 | 5/2002 |
| EP | 1 254 697 A2 | 11/2002 |
| EP | 1 194 207 B1 | 8/2004 |
| GB | 1 039 551 A | 8/1966 |
| GB | 1 075 575 A | 7/1967 |
| GB | 1 088 029 A | 10/1967 |
| GB | 1 107 607 A | 3/1968 |
| GB | 1 374 290 A | 11/1974 |
| GB | 1 395 399 A | 5/1975 |
| GB | 1 520 495 A | 8/1978 |
| GB | 2 022 433 A | 12/1979 |
| GB | 2 078 536 A | 1/1982 |
| WO | WO 00/37736 A2 | 6/2000 |
| WO | WO 01/56678 A1 | 8/2001 |
| WO | WO 01/73286 A1 | 10/2001 |
| WO | WO 02/076576 A2 | 10/2002 |
| WO | WO 03/057345 A1 | 7/2003 |
| WO | WO 2005/120689 A2 | 12/2005 |
| WO | WO 2006/101992 A2 | 9/2006 |
| WO | WO 2006/135703 A2 | 12/2006 |
| WO | WO 2007/041559 A2 | 4/2007 |
| WO | WO 2008/058243 A2 | 5/2008 |
| WO | WO 2009/018463 A2 | 2/2009 |
| WO | WO 2009/042641 A2 | 4/2009 |
| WO | WO 2009/095339 A1 | 8/2009 |
| WO | WO 2010/053537 A2 | 5/2010 |
| WO | WO 2011/101750 A1 | 8/2011 |
| WO | WO 2012/069338 A1 | 5/2012 |
| WO | WO 2014/116946 A1 | 7/2014 |
| WO | WO 2015/036862 A1 | 3/2015 |

* cited by examiner

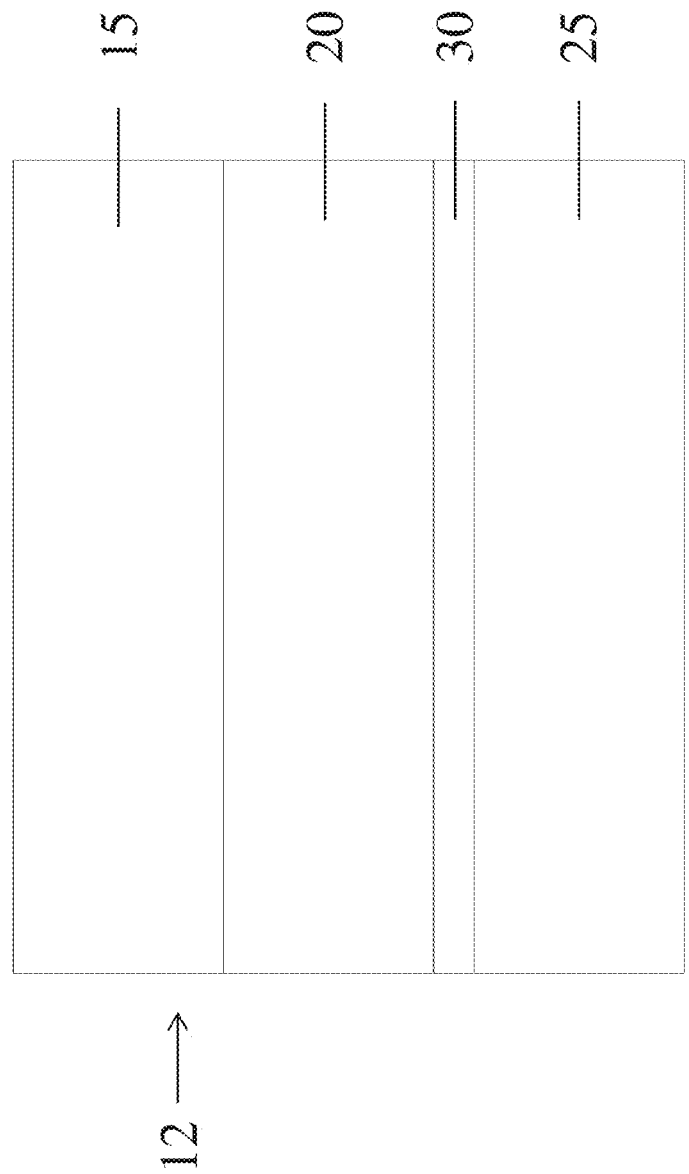

MULTI-LAYERED FILTER MEDIA

RELATED APPLICATIONS

This application is a continuation-in-part of U.S. application Ser. No. 13/675,514, filed Nov. 13, 2012, which is incorporated herein by reference in its entirety.

FIELD OF INVENTION

The present embodiments relate generally to multi-layered filter media, and specifically, to multi-layered filter media having enhanced physical and/or performance characteristics.

BACKGROUND

Filter elements can be used to remove contamination in a variety of applications. Such elements can include a filter media which may be formed of a web of fibers. The fiber web provides a porous structure that permits fluid (e.g., gas, liquid) to flow through the media. Contaminant particles (e.g., dust particles, soot particles) contained within the fluid may be trapped on or in the fiber web. Depending on the application, the filter media may be designed to have different performance characteristics.

In some applications, filter media may include multiple layers. Although many multi-layered filter media exist, improvements in the physical and/or performance characteristics of the layers within the media (e.g., strength, air resistance, efficiency, and high dust holding capacity) would be beneficial.

SUMMARY OF THE INVENTION

Multi-layered filter media having enhanced physical and/or performance characteristics, and related articles, components, and methods associated therewith, are provided. The subject matter of this application involves, in some cases, interrelated products, alternative solutions to a particular problem, and/or a plurality of different uses of structures and compositions.

In one set of embodiments, a filter media is provided. In one embodiment, a filter media includes a first layer comprising a first plurality of fibers, wherein the first layer has a first air permeability and a first mean flow pore size. The filter media also includes a second layer comprising a second plurality of fibers having an average fiber diameter of less than or equal to about 1 micron, wherein the second layer has a second air permeability and a second mean flow pore size. The filter media further includes a third layer comprising a third plurality of fibers, wherein the third plurality of fibers comprises cellulose fibers, and wherein the third layer has a third air permeability and a third mean flow pore size. Each of the first and third air permeabilities is higher than the second air permeability and/or each of the first and third mean flow pore sizes is higher than the second mean flow pore size. The first layer, the second layer, and the third layer may be discrete layers. The second layer is positioned between the first and third layers.

In another embodiment, a filter media includes a first layer comprising a first plurality of fibers. The filter media also includes a second layer comprising a second plurality of fibers. The filter media further includes a third layer comprising cellulose fibers, wherein the third layer has an air permeability of greater than or equal to about 400 L/m²sec and less than or equal to about 2000 L/m²sec, and a Mullen Burst strength of greater than or equal to about 200 kPa and less than or equal to about 500 kPa. The second layer is positioned between the first and third layers.

In another embodiment, a filter media includes a first layer comprising a first plurality of fibers and a second layer comprising a second plurality of fibers. The filter media also includes a third layer having an air permeability greater than or equal to about 400 L/m²sec and less than or equal to about 2000 L/m²sec, and a Mullen Burst strength of greater than or equal to about 200 kPa and less than or equal to about 500 kPa. The filter media further includes a fourth layer having an air permeability greater than or equal to about 1,000 L/m²sec and less than or equal to about 12,000 L/m²sec, a basis weight of greater than or equal to about 5 g/m² and less than or equal to about 70 g/m², and a thickness of less than or equal to about 0.5 mm. The second and fourth layers are positioned between the first and third layers, and the fourth layer is positioned between the second and third layers.

In another embodiment, a filter media includes a first layer comprising a first plurality of fibers, wherein the first layer has a first air permeability and a first mean flow pore size. The filter media also includes a second layer comprising a second plurality of fibers, wherein the second layer has a second air permeability and a second mean flow pore size. The filter media further includes a third layer comprising a third plurality of fibers and a plurality of perforations. The first air permeability is higher than the second air permeability and/or the first mean flow pore size is higher than the second mean flow pore size.

In another embodiment, a filter media includes a first layer comprising a plurality of fibers. The filter media also includes a second layer comprising cellulose fibers and a plurality of perforations.

In another embodiment, a filter media includes a first layer comprising a first plurality of fibers, wherein the first plurality of fibers are synthetic fibers formed by a meltblown process or a centrifugal spinning process, and wherein the first plurality of fibers has an average fiber diameter of greater than about 1.5 microns. The filter media also includes a second layer comprising a second plurality of fibers, wherein the second plurality of fibers are synthetic fibers formed by a meltblown process or a centrifugal spinning process, and wherein the second plurality of fibers has an average fiber diameter of less than or equal to about 1.5 microns. The filter media further includes a third layer comprising a third plurality of fibers, wherein the third plurality of fibers comprises cellulose fibers. The second layer is positioned between the first and third layers.

In another set of embodiments, a method of forming a filter media is provided. The method includes providing a first layer comprising a plurality of fibers. The method also includes providing a second layer comprising cellulose fibers and a plurality of perforations. The method further includes combining the first and second layers.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 2 is a schematic diagram showing a cross-section of a filter media according to one set of embodiments;

DETAILED DESCRIPTION

Filter media are described herein. In some embodiments, the filter media may include multiple layers. Each layer may be designed to have different functions in the filter media. For example, a first layer may be provided for improving dust holding capacity, a second layer for improving efficiency, and a third layer for providing support and strength to the media. By designing the layers to have different primary functions, each layer may be optimized to enhance its function without substantially negatively impacting the performance of another layer of the media. Filter media, as described herein, may be particularly well-suited for applications that involve filtering fuel, air, and lube oil though the media may also be used in other applications (e.g., hydraulic applications).

Figure 1:
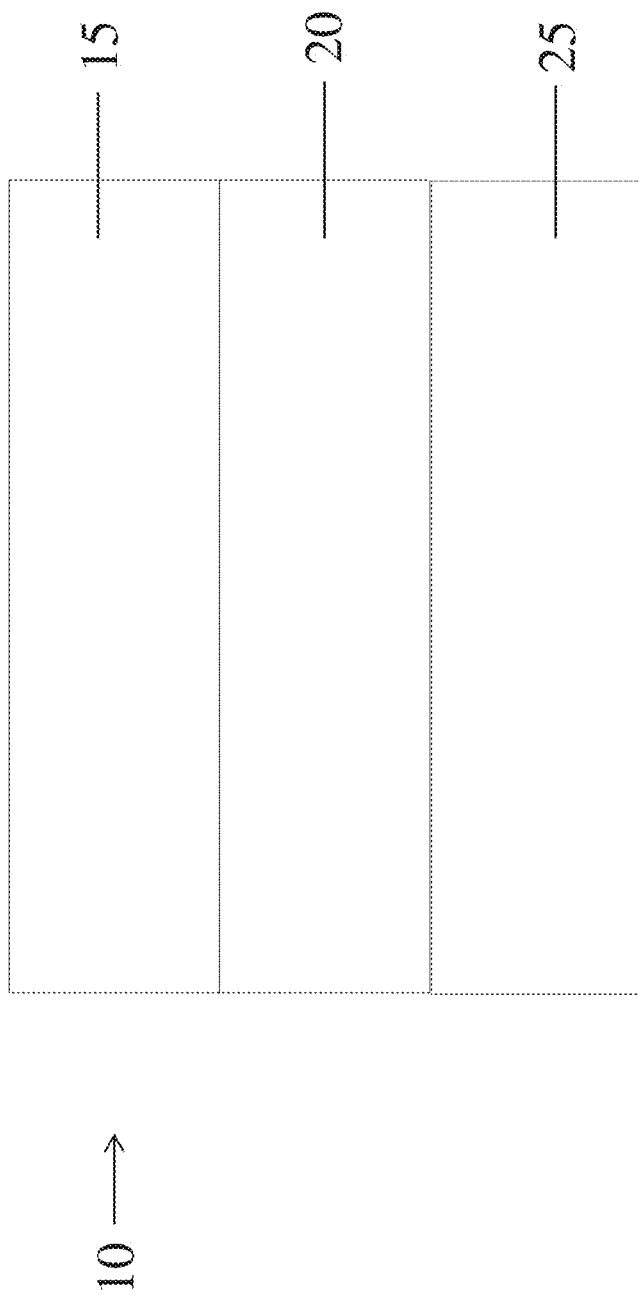
FIG. 1 is a schematic diagram showing a cross-section of a filter media according to one set of embodiments.

An example of a filter media including a plurality of layers is shown in FIG. 1. As shown illustratively in FIG. 1, a filter media 10, shown in cross section, may include a first layer 15, a second layer 20, and a third layer 25. As described above, each of the layers of the media may be designed for a particular primary purpose. For example, in one set of embodiments, the first layer may be used for imparting good dust holding properties to the media, the second layer may be used as an efficiency layer, and the third layer may be used to provide support and strength to the media. In some such embodiments, the second layer may contain a second plurality of fibers and may have an air permeability that is lower than the air permeabilities of the first and/or third layers, as would be expected of a layer imparting efficiency characteristics. The third layer may provide support and strength to the media, while having a relatively high air permeability so as to not substantially affect the resistance across the media.

As described further below, the high air permeability of the third layer may be achieved by including perforations in the layer that reduce the resistance across the layer and/or by designing the layer to have a high air permeability and a relatively high strength. By contrast, in some existing media, support and/or strength can be provided in the same layer that functions as an efficiency layer; however, in certain embodiments, combining two functions in one layer to form a composite layer may compromise the effectiveness of each function. A tradeoff, for instance, between strength and filtration performance may exist for a composite layer designed to have both support and efficiency functions. For example, changes to the physical structure of a composite layer to optimize its structural support role may adversely affect the air permeability of the layer and/or may decrease filtration efficiency.

Furthermore, in other existing filter media and/or filter elements, a non-fibrous support layer such as a layer formed of a wire or mesh is included to provide additional support for the filter media. Often, the extra non-fibrous support layer may have zero or little filtration performance and requires additional manufacturing steps and/or specialized equipment to produce. In some cases, the use of the extra layer may increase the cost and/or difficulty of manufacturing the filter media and/or filter element. When a layer is intended to serve one primary function, as described in certain embodiments herein, the layer may be optimized for its particular function without compromising the function of other layers in the filter media. Additionally or alternatively, optimization of a layer for a particular function may prevent the need for an additional supplemental layer with the same function. It should be appreciated, however, that certain embodiments may include a layer having more than one function.

In some embodiments in which a layer has a separate primary function from another layer, the layer may be designed to be discrete from the other layer. That is, the fibers from one layer do not substantially intermingle with fibers from another layer. For example, with respect to FIG. 1, in one set of embodiments, fibers from the first layer do not substantially intermingle with fibers of the second layer. In another embodiment, the second layer is discrete with at least one adjacent layer. For example, in some embodiments, fibers from the second layer do not intermingle with fibers from the third layer and/or fibers from the first layer. In certain embodiments, each of the first, second and third layers are discrete such that fibers from one layer do not intermingle with fibers of any adjacent layer. Discrete layers may allow for separation of function of the layers. Each discrete layer may be individually optimized without adversely affecting the other layers in the filter media. For example, in a filter media with a discrete efficiency layer and a discrete support layer, the support layer can be perforated to improve its structural support characteristics and air permeability without influencing the filtration efficiency. Discrete layers may be joined by any suitable process including, for example, lamination, thermodot bonding, calendering, ultrasonic processes, or by adhesives, as described in more detail below.

It should be appreciated, however, that certain embodiments may include one or more layers that are not discrete with respect to one another. For example, a first layer functioning primarily as a capacity layer and a second layer function primarily as an efficiency layer may be formed as a composite or multiphase layer.

In some embodiments, a filter media 12 may include a first layer 15, a second layer 20, a third layer 25, and a fourth layer 30, as shown illustratively in FIG. 2. In certain embodiments, the first, second, and third layers in FIG. 2 may be the same as the first, second, and third layers, respectively, in FIG. 1. However, other configurations are possible as one or more of the first, second, and third layers of FIG. 2 may be different from those of FIG. 1 as described in more detail below. In some embodiments, the fourth layer may be a spacer layer. As shown illustratively in FIG. 2, the fourth layer which functions as a spacer layer may be positioned between the second and third layers, however, it should be appreciated that a spacer layer may be positioned between other layers (e.g., between first and second layers) in other embodiments. A spacer layer may reduce shear forces, e.g., during a pleating process, and/or may promote better flow properties. In one example, the spacer layer may be a spunbond layer that is adjacent to a second layer (e.g., an efficiency layer) and/or a third layer (e.g., a support layer).

Figure 3A:
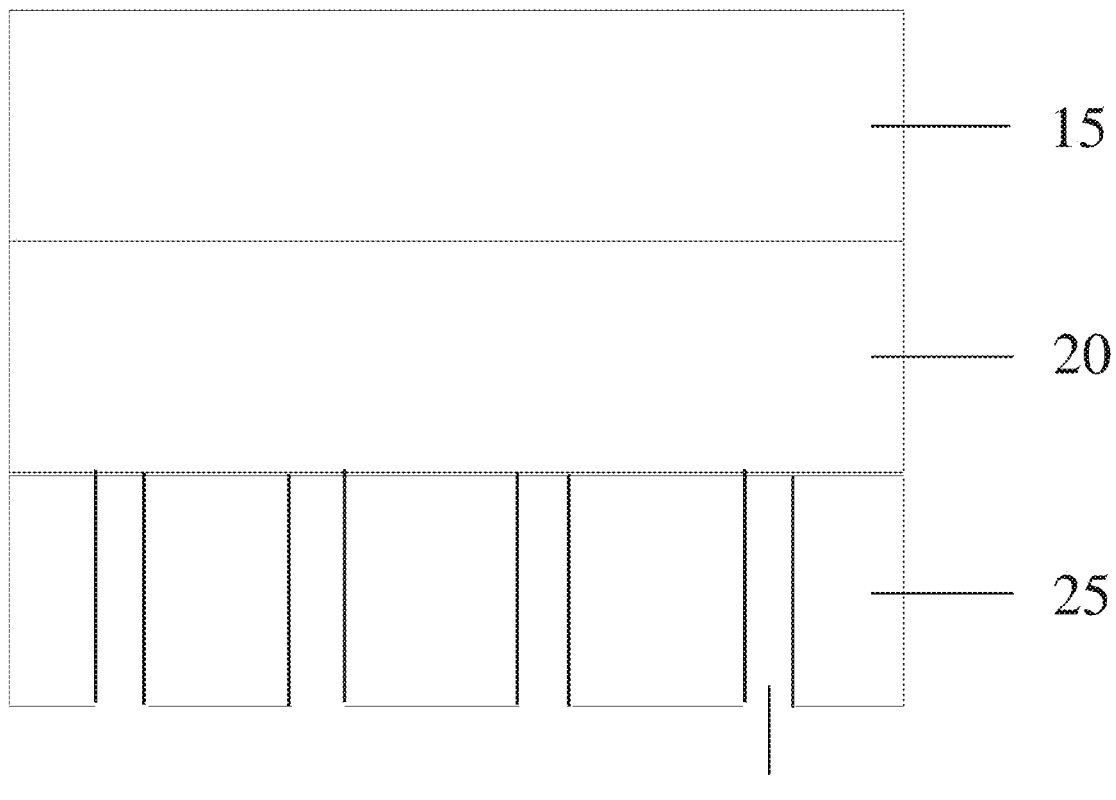
FIG. 3A-B are schematic diagrams showing a cross-section of a filter media including perforations, and a cross-section of a perforation according to one set of embodiments.

As described herein and illustratively shown in FIG. 3A, a filter media 13, shown in cross-section, may include first layer 15, second layer 20, and third layer 25. In this embodiment, the third layer may include a plurality of perforations 35 as shown illustratively in FIG. 3A and as described in more detail below.

Figure 3B:
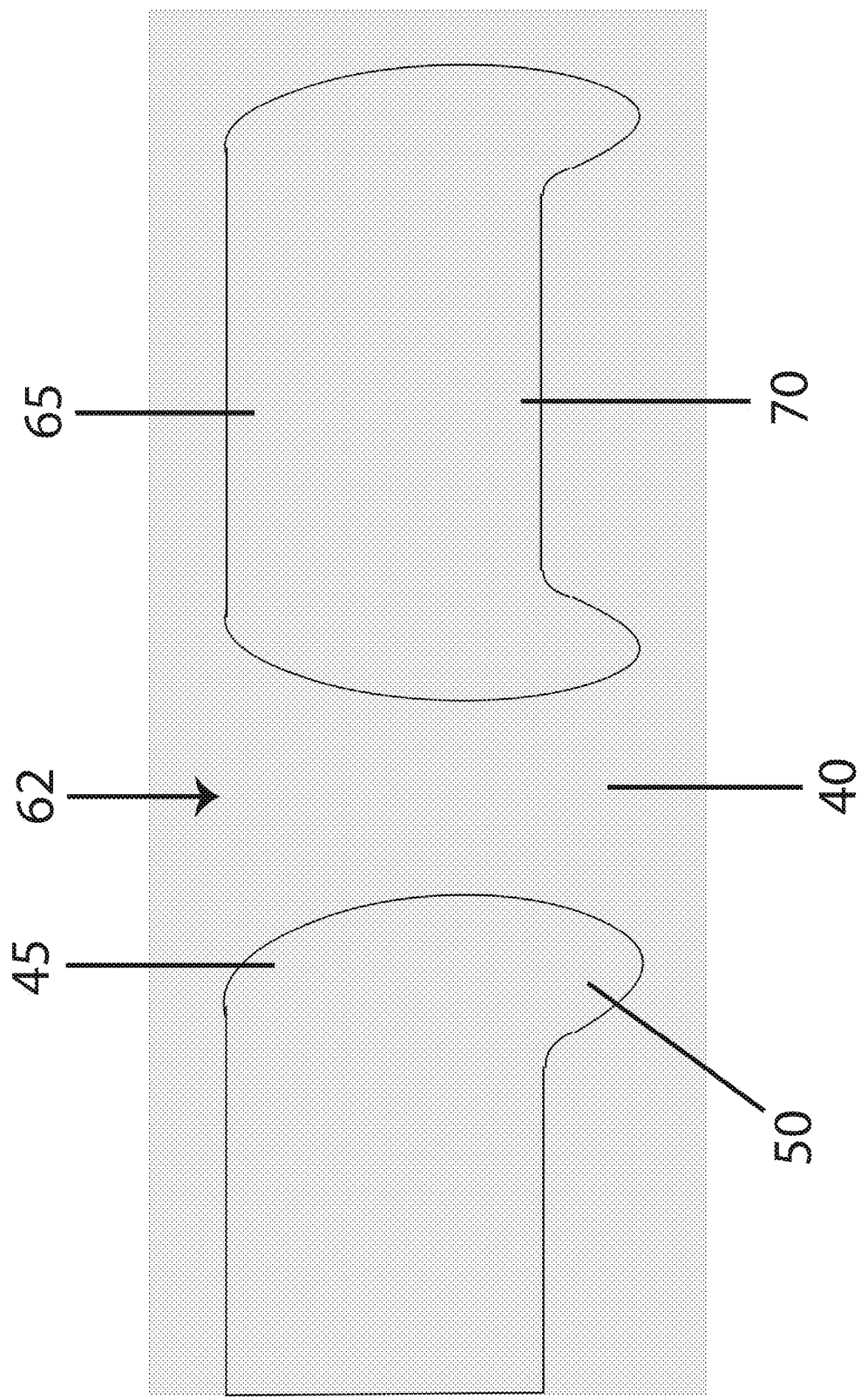

It should be understood that the configurations of the layers shown in the figures are by way of example only, and that in other embodiments, filter media including other configurations of layers may be possible. For example, while the first, second, third (and optionally fourth) layers are shown in a specific order in FIGS. 1-3, in other embodiments, the third layer may be positioned between the first and second layers. In other embodiments, the first layer may be positioned between the second and third layers. Other configurations are also possible. Additionally, it should be appreciated that the terms "first", "second", "third" and "fourth" layers, as used herein, refer to different layers within the media, and are not meant to be limiting with respect to the particular function of that layer. For example, while a "first" layer may be described as being a layer for enhancing dust holding capacity (e.g., a capacity layer) in some embodiments, in other embodiments, a "first" layer may be used to describe a layer used for enhancing efficiency (e.g., an efficiency layer), a layer for providing support (e.g., a support layer), or a layer that functions as a spacer (e.g., a spacer layer). Likewise, each of a "second", "third" and "fourth" layer may independently be used to describe a layer for enhancing dust holding capacity (e.g., a capacity layer), a layer used for enhancing efficiency (e.g., an efficiency layer), a layer for providing support (e.g., a support layer), or a layer that functions as a spacer (e.g., a spacer layer). Additionally, a layer may have more than one such function in certain embodiments. Furthermore, in some embodiments, additional layers (e.g., "fifth", "sixth", or "seventh" layers) may be present in addition to the ones shown in the figures. It should also be appreciated that not all components shown in the figures need be present in some embodiments.

In some embodiments, one or more layers (or sub-layers) in the filter media may include synthetic fibers. Synthetic fibers may include any suitable type of synthetic polymer. Examples of suitable synthetic fibers include staple fibers, polyesters (e.g., polyethylene terephthalate, polybutylene terephthalate), polycarbonate, polyamides (e.g., various nylon polymers), polyaramid, polyimide, polyethylene, polypropylene, polyether ether ketone, polyolefin, acrylics, polyvinyl alcohol, regenerated cellulose (e.g., synthetic cellulose such as lyocell, rayon), polyacrylonitriles, polyvinylidene fluoride (PVDF), copolymers of polyethylene and PVDF, polyether sulfones, and combinations thereof. In some embodiments, the synthetic fibers are organic polymer fibers. Synthetic fibers may also include multi-component fibers (i.e., fibers having multiple compositions such as bicomponent fibers). In some cases, synthetic fibers may include meltblown fibers, which may be formed of polymers described herein (e.g., polyester, polypropylene). In other cases, synthetic fibers may be electrospun fibers. The filter media, as well as each of the layers (or sub-layers) within the filter media, may also include combinations of more than one type of synthetic fiber. It should be understood that other types of synthetic fiber types may also be used.

In some embodiments, the average diameter of the synthetic fibers of one or more layers (or sub-layers) in the filter media may be, for example, greater than or equal to about 0.1 microns, greater than or equal to about 0.3 microns, greater than or equal to about 0.5 microns, greater than or equal to about 1 micron, greater than or equal to about 2 microns, greater than or equal to about 3 microns, greater than or equal to about 4 microns, greater than or equal to about 5 microns, greater than or equal to about 8 microns, greater than or equal to about 10 microns, greater than or equal to about 12 microns, greater than or equal to about 15 microns, or greater than or equal to about 20 microns. In some instances, the synthetic fibers may have an average diameter of less than or equal to about 30 microns, less than or equal to about 20 microns, less than or equal to about 15 microns, less than or equal to about 10 microns, less than or equal to about 7 microns, less than or equal to about 5 microns, less than or equal to about 4 microns, less than or equal to about 1.5 microns, less than or equal to about 1 micron, less than or equal to about 0.8 microns, or less than or equal to about 0.5 microns. Combinations of the above-referenced ranges are also possible (e.g., greater than or equal to about 1 micron and less than or equal to about 5 microns). Other values of average fiber diameter are also possible.

In some cases, the synthetic fibers may be continuous (e.g., meltblown fibers, spunbond fibers, electrospun fibers, centrifugal spun fibers, etc.). For instance, synthetic fibers may have an average length of greater than or equal to about 1 inch, greater than or equal to about 50 inches, greater than or equal to about 100 inches, greater than or equal to about 300 inches, greater than or equal to about 500 inches, greater than or equal to about 700 inches, or greater than or equal to about 900 inches. In some instances, synthetic fibers may have an average length of less than or equal to about 1000 inches, less than or equal to about 800 inches, less than or equal to about 600 inches, less than or equal to about 400 inches, or less than or equal to about 100 inches. Combinations of the above-referenced ranges are also possible (e.g., greater than or equal to about 50 inches and less than or equal to about 1000 inches). Other values of average fiber length are also possible.

In other embodiments, the synthetic fibers are not continuous (e.g., staple fibers). For instance, in some embodiments, synthetic fibers in one or more layers (or sub-layers) in the filter media may have an average length of greater than or equal to about 0.5 mm, greater than or equal to about 1 mm, greater than or equal to about 2 mm, greater than or equal to about 4 mm, greater than or equal to about 6 mm, greater than or equal to about 8 mm, or greater than or equal to about 10 mm. In some instances, synthetic fibers may have an average length of less than or equal to about 12 mm, less than or equal to about 10 mm, less than or equal to about 8 mm, less than or equal to about 6 mm, less than or equal to about 4 mm, or less than or equal to about 2 mm. Combinations of the above-referenced ranges are also possible (e.g., greater than or equal to about 1 mm and less than or equal to about 4 mm). Other values of average fiber length are also possible.

In one set of embodiments, one or more layers in the filter media may include bicomponent fibers. The bicomponent fibers may comprise a thermoplastic polymer. Each component of the bicomponent fiber can have a different melting temperature. For example, the fibers can include a core and a sheath where the activation temperature of the sheath is lower than the melting temperature of the core. This allows the sheath to melt prior to the core, such that the sheath binds to other fibers in the layer, while the core maintains its structural integrity. The core/sheath binder fibers can be concentric or non-concentric. Other exemplary bicomponent fibers can include split fiber fibers, side-by-side fibers, and/or "island in the sea" fibers.

The average diameter of the bicomponent fibers may be, for example, greater than or equal to about 1 micron, greater than or equal to about 2 microns, greater than or equal to about 3 microns, greater than or equal to about 4 microns, greater than or equal to about 5 microns, greater than or equal to about 8 microns, greater than or equal to about 10 microns, greater than or equal to about 12 microns, greater than or equal to about 15 microns, or greater than or equal to about 20 microns. In some instances, the bicomponent fibers may have an average diameter of less than or equal to about 30 microns, less than or equal to about 20 microns, less than or equal to about 15 microns, less than or equal to about 10 microns, less than or equal to about 7 microns, less than or equal to about 5 microns, less than or equal to about 4 microns, or less than or equal to about 2 microns. Combinations of the above-referenced ranges are also possible (e.g., greater than or equal to about 5 microns and less than or equal to about 15 microns). Other values of average fiber diameter are also possible.

In some embodiments, bicomponent fibers may have an average length of greater than or equal to about 0.5 mm, greater than or equal to about 1 mm, greater than or equal to about 2 mm, greater than or equal to about 4 mm, greater than or equal to about 6 mm, greater than or equal to about 8 mm, or greater than or equal to about 10 mm. In some instances, bicomponent fibers may have an average length of less than or equal to about 12 mm, less than or equal to about 8 mm, less than or equal to about 6 mm, less than or equal to about 4 mm, less than or equal to about 2 mm, or less than or equal to about 1 mm. Combinations of the above-referenced ranges are also possible (e.g., greater than or equal to about 1 mm and less than or equal to about 3 mm). Other values of average fiber length are also possible.

In some embodiments, one or more layers (or sub-layers) in the filter media may include one or more cellulose fibers, such as softwood fibers, hardwood fibers, a mixture of hardwood and softwood fibers, regenerated cellulose fibers, and mechanical pulp fibers (e.g., groundwood, chemically treated mechanical pulps, and thermomechanical pulps). Exemplary softwood fibers include fibers obtained from mercerized southern pine (e.g., mercerized southern pine fibers or "HPZ fibers"), northern bleached softwood kraft (e.g., fibers obtained from Robur Flash ("Robur Flash fibers")), southern bleached softwood kraft (e.g., fibers obtained from Brunswick pine ("Brunswick pine fibers")), or chemically treated mechanical pulps ("CTMP fibers"). For example, HPZ fibers can be obtained from Buckeye Technologies, Inc., Memphis, Tenn.; Robur Flash fibers can be obtained from Rottneros AB, Stockholm, Sweden; and Brunswick pine fibers can be obtained from Georgia-Pacific, Atlanta, Ga. Exemplary hardwood fibers include fibers obtained from Eucalyptus ("Eucalyptus fibers"). Eucalyptus fibers are commercially available from, e.g., (1) Suzano Group, Suzano, Brazil ("Suzano fibers"), (2) Group Portucel Soporcel, Cacia, Portugal ("Cacia fibers"), (3) Tembec, Inc., Temiscaming, QC, Canada ("Tarascon fibers"), (4) Kartonimex Intercell, Duesseldorf, Germany, ("Acacia fibers"), (5) Mead-Westvaco, Stamford, Conn. ("Westvaco fibers"), and (6) Georgia-Pacific, Atlanta, Ga. ("Leaf River fibers").

The average diameter of the cellulose fibers in one or more layers (or sub-layers) in the filter media may be, for example, greater than or equal to about 1 micron, greater than or equal to about 2 microns, greater than or equal to about 3 microns, greater than or equal to about 4 microns, greater than or equal to about 5 microns, greater than or equal to about 8 microns, greater than or equal to about 10 microns, greater than or equal to about 15 microns, greater than or equal to about 20 microns, greater than or equal to about 30 microns, or greater than or equal to about 40 microns. In some instances, the cellulose fibers may have an average diameter of less than or equal to about 50 microns, less than or equal to about 40 microns, less than or equal to about 30 microns, less than or equal to about 20 microns, less than or equal to about 15 microns, less than or equal to about 10 microns, less than or equal to about 7 microns, less than or equal to about 5 microns, less than or equal to about 4 microns, or less than or equal to about 2 microns. Combinations of the above-referenced ranges are also possible (e.g., greater than or equal to about 1 micron and less than or equal to about 5 microns). Other values of average fiber diameter are also possible.

In some embodiments, the cellulose fibers may have an average length. For instance, in some embodiments, cellulose fibers may have an average length of greater than or equal to about 0.5 mm, greater than or equal to about 1 mm, greater than or equal to about 2 mm, greater than or equal to about 3 mm, greater than or equal to about 4 mm, greater than or equal to about 5 mm, greater than or equal to about 6 mm, or greater than or equal to about 8 mm. In some instances, cellulose fibers may have an average length of less than or equal to about 10 mm, less than or equal to about 8 mm, less than or equal to about 6 mm, less than or equal to about 4 mm, less than or equal to about 2 mm, or less than or equal to about 1 mm. Combinations of the above-referenced ranges are also possible (e.g., greater than or equal to about 1 mm and less than or equal to about 3 mm). Other values of average fiber length are also possible.

In some embodiments, one or more layers in the filter media may include fibrillated fibers. As known to those of ordinary skill in the art, a fibrillated fiber includes a parent fiber that branches into smaller diameter fibrils, which can, in some instances, branch further out into even smaller diameter fibrils with further branching also being possible. The branched nature of the fibrils leads to a layer and/or fiber web having a high surface area and can increase the number of contact points between the fibrillated fibers and other fibers in the web. Such an increase in points of contact between the fibrillated fibers and other fibers and/or components of the web may contribute to enhancing mechanical properties (e.g., flexibility, strength) and/or filtration performance properties of the layer and/or fiber web.

As noted above, fibrillated fibers include parent fibers and fibrils. In some embodiments, the parent fibers may have an average diameter of less than or equal to about 75 microns, less than or equal to about 60 microns, less than or equal to about 50 microns, less than or equal to about 40 microns, less than or equal to about 30 microns, less than or equal to about 20 microns, or less than or equal to about 15 microns. In some embodiments the parent fibers may have an average diameter of greater than or equal to about 10 microns, greater than or equal to about 15 microns, greater than or equal to about 20 microns, greater than or equal to about 30 microns, greater than or equal to about 40 microns, greater than or equal to about 50 microns, greater than or equal to about 60 microns, or greater than or equal to about 75 microns. Combinations of the above referenced ranges are also possible (e.g., parent fibers having an average diameter of greater than or equal to about 15 microns and less than about 75 microns). Other ranges are also possible.

In some embodiments, the fibrils may have an average diameter of less than or equal to about 15 microns, less than or equal to about 10 microns, less than or equal to about 8 microns, less than or equal to about 6 microns, less than or equal to about 4 microns, less than or equal to about 3 microns, less than or equal to about 2 microns, or less than or equal to about 1 micron. In some embodiments the fibrils may have an average diameter of greater than or equal to about 0.2 microns, greater than or equal to about 1 micron, greater than or equal to about 2 microns, greater than or equal to about 3 microns, greater than or equal to about 4 microns, greater than or equal to about 6 microns, greater than or equal to about 8 microns, or greater than or equal to about 10 microns. Combinations of the above referenced ranges are also possible (e.g., fibrils having an average diameter of greater than or equal to about 3 microns and less than about 6 microns). Other ranges are also possible.

In some embodiments, the average length of a fibrillated fiber may be less than or equal to about 10 mm, less than or equal to about 8 mm, less than or equal to about 6 mm, less than or equal to about 5 mm, less than or equal to about 4 mm, less than or equal to about 3 mm, or less than or equal to about 2 mm. In certain embodiments, the average length of fibrillated fibers may be greater than or equal to about 1 mm, greater than or equal to about 2 mm, greater than or equal to about 4 mm, greater than or equal to about 5 mm, greater than equal to about 6 mm, or greater than or equal to about 8 mm. Combinations of the above referenced ranges are also possible (e.g., fibrillated fibers having an average length of greater than or equal to about 4 mm and less than about 6 mm). Other ranges are also possible. The average length of the fibrillated fibers refers to the average length of parent fibers from one end to an opposite end of the parent fibers. In some embodiments, the maximum average length of the fibrillated fibers falls within the above-noted ranges. The maximum average length refers to the average of the maximum dimension along one axis of the fibrillated fibers (including parent fibers and fibrils). It should be understood that, in certain embodiments, the fibers and fibrils may have dimensions outside the above-noted ranges.

The level of fibrillation of the fibrillated fibers may be measured according to any number of suitable methods. For example, the level of fibrillation can be measured according to a Canadian Standard Freeness (CSF) test, specified by TAPPI test method T 227 om 09 Freeness of pulp. The test can provide an average CSF value. In some embodiments, the average CSF value of the fibrillated fibers may vary between about 10 mL and about 750 mL. In certain embodiments, the average CSF value of the fibrillated fibers used in a fiber web may be greater than or equal to about 10 mL, greater than or equal to about 50 mL, greater than or equal to about 100 mL, greater than or equal to about 200 mL, greater than or equal to about 400 mL, greater than or equal to about 600 mL, or greater than or equal to about 700 mL. In some embodiments, the average CSF value of the fibrillated fibers may be less than or equal to about 800 mL, less than or equal to about 600 mL, less than or equal to about 400 mL, less than or equal to about 200 mL, less than or equal to about 100 mL, or less than or equal to about 50 mL. Combinations of the above-referenced ranges are also possible (e.g., an average CSF value of fibrillated fibers of greater than or equal to about 10 mL and less than or equal to about 300 mL). Other ranges are also possible. The average CSF value of the fibrillated fibers may be based on one type of fibrillated fiber or more than one type of fibrillated fiber.

In some embodiments, one or more layers (or sub-layers) in the filter media may include glass fibers (e.g., microglass fibers, chopped strand glass fibers, or a combination thereof). Microglass fibers and chopped strand glass fibers are known to those skilled in the art. One skilled in the art is able to determine whether a glass fiber is microglass or chopped strand by observation (e.g., optical microscopy, electron microscopy). Microglass fibers may also have chemical differences from chopped strand glass fibers. In some cases, though not required, chopped strand glass fibers may contain a greater content of calcium or sodium than microglass fibers. For example, chopped strand glass fibers may be close to alkali free with high calcium oxide and alumina content. Microglass fibers may contain 10-15% alkali (e.g., sodium, magnesium oxides) and have relatively lower melting and processing temperatures. The terms refer to the technique(s) used to manufacture the glass fibers. Such techniques impart the glass fibers with certain characteristics. In general, chopped strand glass fibers are drawn from bushing tips and cut into fibers in a process similar to textile production. Chopped strand glass fibers are produced in a more controlled manner than microglass fibers, and as a result, chopped strand glass fibers will generally have less variation in fiber diameter and length than microglass fibers. Microglass fibers are drawn from bushing tips and further subjected to flame blowing or rotary spinning processes. In some cases, fine microglass fibers may be made using a remelting process. In this respect, microglass fibers may be fine or coarse. As used herein, fine microglass fibers are less than or equal to 1 micron in diameter and coarse microglass fibers are greater than or equal to 1 micron in diameter.

The microglass fibers may have small diameters. For instance, in some embodiments, the average diameter of the microglass fibers may be less than or equal to about 9 microns, less than or equal to about 7 microns, less than or equal to about 5 microns, less than or equal to about 3 microns, or less than or equal to about 1 micron. In some instances, the microglass fibers may have an average fiber diameter of greater than or equal to about 0.1 microns, greater than or equal to about 0.3 microns, greater than or equal to about 1 micron, greater than or equal to about 3 microns, or greater than or equal to about 7 microns. Combinations of the above-referenced ranges are also possible (e.g., greater than or equal to about 0.1 microns and less than or equal to about 9 microns). Other values of average fiber diameter are also possible. Average diameter distributions for microglass fibers are generally log-normal. However, it can be appreciated that microglass fibers may be provided in any other appropriate average diameter distribution (e.g., Gaussian distribution).

In some embodiments, the average length of microglass fibers may be less than or equal to about 10 mm, less than or equal to about 8 mm, less than or equal to about 6 mm, less than or equal to about 5 mm, less than or equal to about 4 mm, less than or equal to about 3 mm, or less than or equal to about 2 mm. In certain embodiments, the average length of microglass fibers may be greater than or equal to about 1 mm, greater than or equal to about 2 mm, greater than or equal to about 4 mm, greater than or equal to about 5 mm, greater than equal to about 6 mm, or greater than or equal to about 8 mm. Combinations of the above referenced ranges are also possible (e.g., microglass fibers having an average length of greater than or equal to about 4 mm and less than about 6 mm). Other ranges are also possible.

In other embodiments, the microglass fibers may vary significantly in length as a result of process variations. For instance, in some embodiments, the average aspect ratios (length to diameter ratio) of the microglass fibers in a layer (or sub-layer) may be greater than or equal to about 100, greater than or equal to about 200, greater than or equal to about 300, greater than or equal to about 1000, greater than or equal to about 3,000, greater than or equal to about 6,000, greater than or equal to about 9,000. In some instances, the microglass fibers may have an average aspect ratio of less than or equal to about 10,000, less than or equal to about 5,000, less than or equal to about 2,500, less than or equal to about 600, or less than or equal to about 300. Combinations of the above-referenced ranges are also possible (e.g., greater than or equal to about 200 and less than or equal to about 2,500). Other values of average aspect ratio are also possible. It should be appreciated that the above-noted dimensions are not limiting and that the microglass fibers may also have other dimensions.

In general, chopped strand glass fibers may have an average fiber diameter that is greater than the diameter of the microglass fibers. For instance, in some embodiments, the average diameter of the chopped strand glass fibers may be greater than or equal to about 5 microns, greater than or equal to about 7 microns, greater than or equal to about 9 microns, greater than or equal to about 11 microns, or greater than or equal to about 20 microns. In some instances, the chopped strand glass fibers may have an average fiber diameter of less than or equal to about 30 microns, less than or equal to about 25 microns, less than or equal to about 15 microns, less than or equal to about 12 microns, or less than or equal to about 10 microns. Combinations of the above-referenced ranges are also possible (e.g., greater than or equal to about 5 microns and less than or equal to about 12 microns). Other values of average fiber diameter are also possible. Chopped strand diameters tend to follow a normal distribution. Though, it can be appreciated that chopped strand glass fibers may be provided in any appropriate average diameter distribution (e.g., Gaussian distribution).

In some embodiments, chopped strand glass fibers may have a length in the range of between about 0.125 inches and about 1 inch (e.g., about 0.25 inches, or about 0.5 inches). In some embodiments, the average length of chopped strand glass fibers may be less than or equal to about 1 inch, less than or equal to about 0.8 inches, less than or equal to about 0.6 inches, less than or equal to about 0.5 inches, less than or equal to about 0.4 inches, less than or equal to about 0.3 inches, or less than or equal to about 0.2 inches. In certain embodiments, the average length of chopped strand glass fibers may be greater than or equal to about 0.125 inches, greater than or equal to about 0.2 inches, greater than or equal to about 0.4 inches, greater than or equal to about 0.5 inches, greater than equal to about 0.6 inches, or greater than or equal to about 0.8 inches. Combinations of the above referenced ranges are also possible (e.g., chopped strand glass fibers having an average length of greater than or equal to about 0.125 inches and less than about 1 inch). Other ranges are also possible.

It should be appreciated that the above-noted dimensions are not limiting and that the microglass and/or chopped strand fibers, as well as the other fibers described herein, may also have other dimensions.

In certain embodiments the third layer (e.g., a support layer) may include a plurality of perforations as illustrated in FIG. 3A. In some instances, the discrete nature of the layer may allow it to be perforated without altering or influencing other layers in the filter media. Additionally, perforations in the layer may allow the use of a broad range of fiber compositions well-suited for support applications, and may even allow the use of fiber compositions that typically would not have been used (or used in large amounts) in filter media. Moreover, a wet laid layer with an exceptionally tight structure may have too low of an air permeability that prohibits its use in most filter media. Introducing perforations into the layer may impart high air permeability, while allowing the layer to maintain good support characteristics. In another example, perforating a tight structural layer with compact internal structure and high air resistance may produce a relatively open structural layer with low air resistance. Perforating the layer may also enhance its pleat stability and/or structural support characteristics.

In some embodiments, perforating a layer may result in a plurality of holes through the full thickness of the layer. In one embodiment, perforation 35, as shown illustratively in cross-section in FIG. 3B, may define a hole 40. In some embodiments, e.g., depending on the method of forming the protrusions, a structural formation 45 (e.g., a concave structural formation) may be included on one face of the hole, and another structural formation 50 (e.g., a convex structural formation) may be included on the other face of the hole. In certain embodiments, the hole and the structural formations may be produced by the application of force 62 to a surface 65 of the layer, e.g., during the perforating process. After perforation, a structural formation (e.g., a concave structural formation) may exist around the hole on the surface where the force was applied. A structural formation (e.g., a convex structural formation) may exist around the hole on the opposite surface 70. In some instances, a structural formation may include displaced material that protrudes outward from a surface of the layer (i.e., away from the interior of the layer), referred to herein as a protrusion. The presence of a protrusion may indicate that a layer has been subjected to a perforation process. It should be appreciated, however, that not all perforations need to include structural formations (e.g., a concave structural formation and/or a convex structural formation), and/or protrusions, and that perforations without such structural formations and/or protrusions are also possible in some embodiments. For example, a perforation formed by the application of thermal energy (e.g., a laser) may produce a hole without any such structural formations and/or protrusions.

As noted above, perforations may enhance the pleat stability of filter media that are subjected to a pleating process. For example, the protrusions may function as a structural spacer between the pleats which may help prevent pleat collapse. Optionally, as described in more detail below, a layer impregnated with a resin and subjected to a perforation process may include protrusions that are strengthened with the resin. This configuration of the protrusions may also aid in preventing pleat collapse.

In certain embodiments, a perforation may have defined attributes, such as shape, size, aspect ratio, length, and/or width. For example, each perforation in the plurality of perforations may have a defined shape, which may be, for example, substantially circular, square, rectangular, trapezoidal, polygonal or oval in cross-section and/or in plan view (i.e., viewed from above). The shapes may be regular or irregular. Other shapes are also possible.

In some instances, the average diameter of the perforations (e.g., average diameter of the holes) may be measured at a surface of the layer including the perforations. In some embodiments, the average diameter of the perforations may be substantially similar throughout the perforation. For instance, in some embodiments, the average diameter may be greater than or equal to about 0.5 mm, greater than or equal to about 1.0 mm, greater than or equal to about 2 mm, greater than or equal to about 3 mm, greater than or equal to about 4 mm, greater than or equal to about 6 mm, or greater than or equal to about 8 mm. In some instances, the plurality of perforations may have an average diameter of less than or equal to about 10 mm, less than or equal to about 8 mm, less than or equal to about 6 mm, less than or equal to about 4 mm, less than or equal to about 3 mm, or less than or equal to about 2 mm. Combinations of the above-referenced ranges are also possible (e.g., greater than or equal to about 2 mm and less than or equal to about 3 mm). Other values of average diameter are also possible.

In other instances, the perforations may be characterized by the average aspect ratio (i.e., a ratio of length to width) of the perforations (e.g., measured at a surface of the layer including the perforations). For instance, in some embodiments, the perforations may have an average aspect ratio of greater than or equal to about 1.0, greater than or equal to about 1.3, greater than or equal to about 1.5, greater than or equal to about 2.0, or greater than or equal to about 2.5. In some instances, the plurality of perforations may have an average aspect ratio of less than or equal to about 5, less than or equal to about 3, less than or equal to about 2.5, less than or equal to about 2, or less than or equal to about 1.5. Combinations of the above-referenced ranges are also possible (e.g., an average aspect ratio of greater than or equal to about 1 and less than or equal to about 1.5). Other values of average aspect ratio are also possible.

In general, a perforation may have any suitable combination of shape, size, and aspect ratio to achieve the desired properties.

The perforations may also be characterized by the average length and/or average width of any protrusions present adjacent the perforations. The length of a protrusion may be characterized by the longest dimension of the protrusion, and the width may be characterized by the distance perpendicular to the length at the half-length of the protrusion. In some embodiments, the perforations may have an average protrusion length of greater than or equal to about 0.5 mm, greater than or equal to about 1.0 mm, greater than or equal to about 2 mm, greater than or equal to about 3 mm, greater than or equal to about 4 mm, greater than or equal to about 5 mm, or greater than or equal to about 8 mm. In some instances, the perforations may have an average protrusion length of less than or equal to about 10 mm, less than or equal to about 8 mm, less than or equal to about 5 mm, less than or equal to about 4 mm, less than or equal to about 3 mm, or less than or equal to about 2 mm. Combinations of the above-referenced ranges are also possible (e.g., greater than or equal to about 1 mm and less than or equal to about 5 mm). Other values of average protrusion length are also possible.

Additionally, in some embodiments the perforations may have an average protrusion width of greater than or equal to about 0.5 mm, greater than or equal to about 1.0 mm, greater than or equal to about 2 mm, greater than or equal to about 3 mm, greater than or equal to about 4 mm, greater than or equal to about 5 mm, or greater than or equal to about 8 mm. In some instances, the perforations may have an average protrusion width of less than or equal to about 10 mm, less than or equal to about 8 mm, less than or equal to about 5 mm, less than or equal to about 4 mm, less than or equal to about 3 mm, or less than or equal to about 2 mm. Combinations of the above-referenced ranges are also possible (e.g., greater than or equal to about 1 mm and less than or equal to about 5 mm). Other values of average protrusion width are also possible. In some embodiments, the protrusions have substantially the same widths and lengths (e.g., protrusions in the shape of a square).

In embodiments, the perforations may be arranged such that a defined periodicity (i.e., distance between the geometric centers of neighboring perforations) and/or pattern exists in the layer. The periodicity may be measured in the machine direction and/or in the cross direction. In some embodiments, the perforations may have an average periodicity of greater than or equal to about 2 mm, greater than or equal to about 5 mm, greater than or equal to about 10 mm, greater than or equal to about 12 mm, greater than or equal to about 15 mm, greater than or equal to about 20 mm, or greater than or equal to about 28 mm. In some instances, the perforations may have an average periodicity of less than or equal to about 30 mm, less than or equal to about 22 mm, less than or equal to about 18 mm, less than or equal to about 14 mm, less than or equal to about 10 mm, or less than or equal to about 6 mm. Combinations of the above-referenced ranges are also possible (e.g., greater than or equal to about 5 mm and less than or equal to about 20 mm). Other values of average periodicity are also possible.

Figure 4:
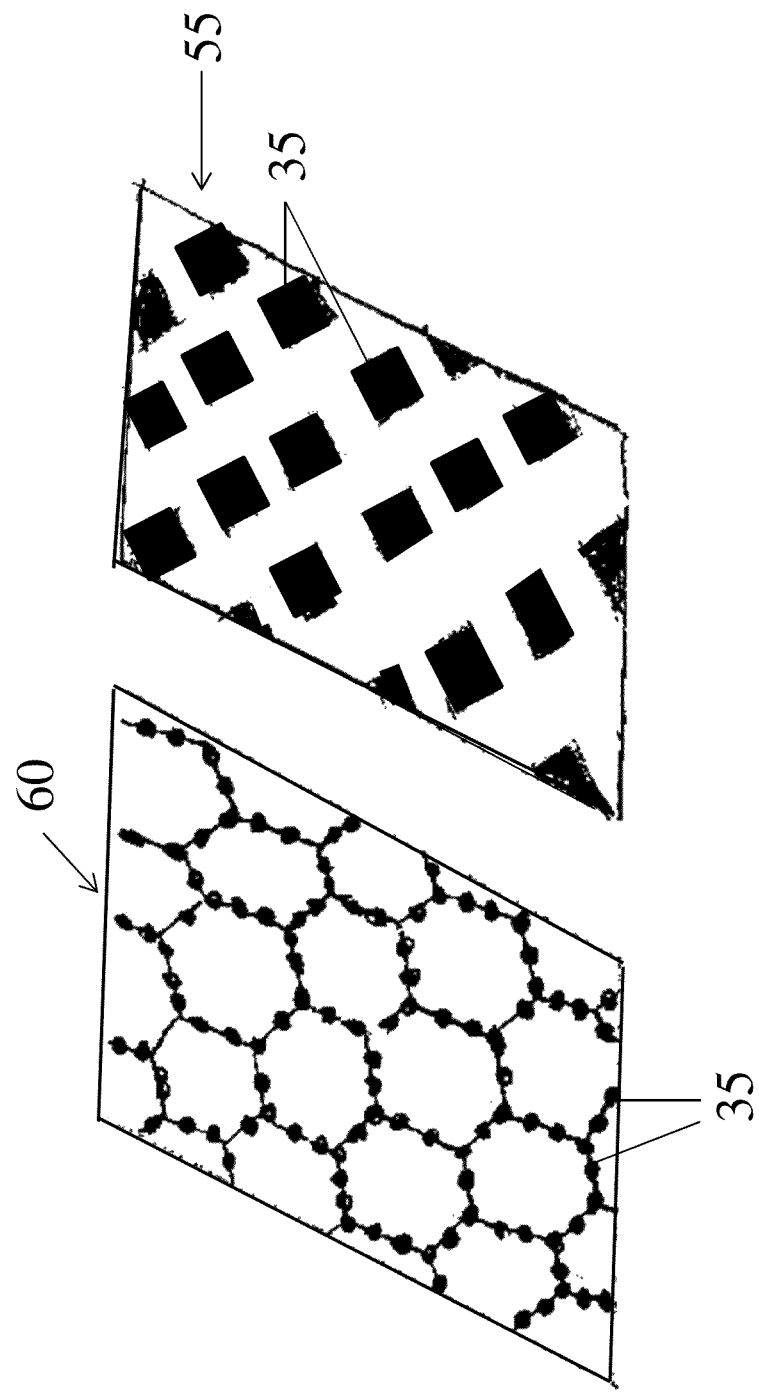
FIG. 4 is a schematic diagram showing different patterns of perforations according to one set of embodiments.

In some embodiments, the periodicity of the perforations may be regular across the layer. In other embodiments, the periodicity of the perforations may be irregular and/or may vary based on a certain factors, such as location in the layer or the pattern of the perforations. In certain embodiments, as illustrated in FIG. 4, the plurality of perforations may be arranged to form a pattern. In some embodiments, the pattern of perforations 35 may be simple, such as a checkerboard pattern 55, or more complex like a honeycomb pattern 60 shown in FIG. 4. In other cases, for example, the pattern may be cubic, hexagonal, and/or polygonal. In general, any suitable pattern can be used to achieve the desired properties. It should be noted, however, that the plurality of perforations may not have a defined pattern and/or periodicity in some embodiments.

In certain embodiments, the perforations may cover a certain percentage of the surface area of a layer (i.e., the combined surface area of the perforations as a percentage of the total area of the layer as measured by its length times width). For instance, in some embodiments, the perforations may cover greater than or equal to about 1%, greater than or equal to about 3%, greater than or equal to about 5%, greater than or equal to about 8%, greater than or equal to about 10%, greater than or equal to about 15%, greater than or equal to about 20%, or greater than or equal to about 25% of the surface area of the layer. In some instances, perforations may cover less than or equal to about 30%, less than or equal to about 25%, less than or equal to about 20%, less than or equal to about 15%, less than or equal to about 10%, or less than or equal to about 5% of the surface area of the layer. Combinations of the above-referenced ranges are also possible (e.g., greater than or equal to about 5% and less than or equal to about 20%). Other ranges of coverage are also possible.

In some embodiments, it should be understood that the third layer need not include any perforations.

Regardless of whether or not the third layer includes perforations, in some embodiments, the third layer may be substantially joined to at least one layer (e.g., a first layer, a second layer, and/or a fourth layer) in the filter media (e.g., by lamination, point bonding, thermo-dot bonding, ultrasonic bonding, calendering, use of adhesives (e.g., glue-web), and/or co-pleating). A substantially joined layer may have, for example, greater than equal to about 25%, greater than equal to about 50%, greater than equal to about 75%, or greater than equal to about 90% of its surface in contact with another layer of the filter media. In some embodiments, 100% of the surface of the layer may be in contact with another layer.

Moreover, regardless of whether or not the third layer includes perforations, the layer may be a measurable weight percentage of the entire filter media. For instance, in some embodiments, the weight percentage of the third layer in the entire filter media may be greater than or equal to about 10 wt %, greater than or equal to about 25 wt %, greater than or equal to about 35 wt %, greater than or equal to about 45 wt %, greater than or equal to about 55 wt %, greater than or equal to about 65 wt %, or greater than or equal to about 75 wt %. In some instances, the weight percentage of the third layer in the entire filter media may be less than or equal to about 80 wt %, less than or equal to about 65 wt %, less than or equal to about 50 wt %, less than or equal to about 40 wt %, less than or equal to about 30 wt %, or less than or equal to about 20 wt %. Combinations of the above-referenced ranges are also possible (e.g., greater than or equal to about 25 wt % and less than or equal to about 65 wt %). Other values of weight percentage of the third layer in the entire filter media are also possible.

The third layer (e.g., a support layer) may include a plurality of fibers. In general, a number of different materials can be used to form the fibers as described below. In some embodiments, the fibers are made from cellulose. Examples of cellulose fibers are provided above.

In some cases, the third layer (e.g., support layer) may have a specific weight percentage of cellulose fibers. For instance, in some embodiments, the weight percentage of cellulose fibers in the third layer may be greater than or equal to about 40%, greater than or equal to about 55%, greater than or equal to about 70%, greater than or equal to about 75%, greater than or equal to about 80%, or greater than or equal to about 90%. In some instances, the weight percentage of cellulose fibers in the third layer may be less than or equal to about 100%, less than or equal to about 85%, less than or equal to about 75%, less than or equal to about 65%, or less than or equal to about 55%. Combinations of the above-referenced ranges are also possible (e.g., greater than or equal to about 70% and less than or equal to about 80%). In some embodiments, 100% of the fibers in the third layer are cellulose fibers. Other values of weight percentage of the cellulose fibers in the third layer are also possible.

In certain embodiments, the use of cellulose fibers may allow the layer to be specifically optimized for a particular filter media application. In one example, cellulose fibers may allow the surface chemistry of the layer to be easily modified (e.g., by hydrophobic surface treatments) to be well-suited for filtration (e.g., air filtration). Cellulose fibers may also allow the resin to be selected based on properties other than structural support, such as pleat-ability. In other embodiments, cellulose fibers may be obtained from a recycling process. For example, a layer may be produced using material (e.g., fibers) from recycled paper.

In addition to the cellulose fibers described above, the third layer may also include one or more of glass fibers, synthetic fibers, bicomponent fibers, and/or fibrillated fibers. Alternatively, in other embodiments, the third layer may include glass fibers, synthetic fibers, bicomponent fibers, and/or fibrillated fibers in lieu of cellulose fibers. For instance, in some embodiments, the weight percentage of each of glass fibers, synthetic fibers, bicomponent fibers, and/or fibrillated fibers in the third layer may independently be greater than or equal to about 0%, greater than or equal to about 0.1%, greater than or equal to about 1%, greater than or equal to about 2%, greater than or equal to about 5%, greater than or equal to about 10%, greater than or equal to about 15%, greater than or equal to about 20%, greater than or equal to about 30%, or greater than or equal to about 40%. In some instances, the weight percentage of each of the glass fibers, synthetic fibers, bicomponent fibers, and/or fibrillated fibers in the third layer may independently be less than or equal to about 50%, less than or equal to about 40%, less than or equal to about 30%, less than or equal to about 20%, less than or equal to about 15%, less than or equal to about 10%, less than or equal to about 5%, less than or equal to about 2%, less than or equal to about 0.5%, or less than or equal to about 0.1%. Combinations of the above-referenced ranges are also possible (e.g., greater than or equal to about 0% and less than or equal to about 20%). Other values of weight percentages of the fibers in the third layer are also possible. Examples of glass fibers, synthetic fibers, and bicomponent fibers are provided in more detail herein. In one example, the third layer may contain synthetic (e.g., polyester) fibers to increase the durability of the layer.

In some cases, the average diameter of the fibers in the third layer may be larger than the average diameter of the fibers in one or more other layers of the filter media (e.g., a first, a second, and/or a fourth layer). In one example, the average diameter of the fibers in the third layer may be larger than the average diameter of fibers in a first layer (e.g., a capacity layer) and/or a second layer (e.g., an efficiency layer). In some embodiments, a plurality of fibers in the third layer may have an average diameter of greater than or equal to about 20 microns, greater than or equal to about 25 microns, greater than or equal to about 30 microns, greater than or equal to about 32 microns, greater than or equal to about 34 microns, greater than or equal to about 36 microns, or greater than or equal to about 40 microns. In some instances, the plurality of fibers may have an average diameter of less than or equal to about 50 microns, less than or equal to about 40 microns, less than or equal to about 38 microns, less than or equal to about 35 microns, less than or equal to about 33 microns, or less than or equal to about 25 microns. Combinations of the above-referenced ranges are also possible (e.g., an average diameter of greater than or equal to about 30 microns and less than or equal to about 40 microns). Other values of average fiber diameter are also possible.

In some embodiments, fibers in the third layer may have an average length of greater than or equal to about 0.5 mm, greater than or equal to about 1 mm, greater than or equal to about 2 mm, greater than or equal to about 3 mm, greater than or equal to about 4 mm, greater than or equal to about 6 mm, or greater than or equal to about 8 mm. In some instances, the plurality of fibers may have an average length of less than or equal to about 10 mm, less than or equal to about 8 mm less than or equal to about 7 mm, less than or equal to about 5 mm, less than or equal to about 3 mm, less than or equal to about 2 mm, or less than or equal to about 1 mm. Combinations of the above-referenced ranges are also possible (e.g., greater than or equal to about 1 mm and less than or equal to about 3 mm). Other values of average fiber length are also possible.

The third layer, in addition to a plurality of fibers, may also include other components, such as a resin, surface treatments, and/or additives. In general, any suitable resin may be used to achieve the desired properties. For example, the resin may be polymeric, water-based, or solvent-based. In certain embodiments, the resin may also include additives, such as flame retardants, hydrophobic additives, and/or hydrophilic additives. In some cases, the additives in the third layer may include viscose, nanoparticles, zeolite, and/or diamaceous earth.

The third layer (e.g., a support layer), as described herein, may have certain structural characteristics, such as basis weight, thickness, and density. For instance, in some embodiments, the third layer may have a basis weight of greater than or equal to about 50 $g/m^2$, greater than or equal to about 75 $g/m^2$, greater than or equal to about 90 $g/m^2$, greater than or equal to about 105 $g/m^2$, greater than or equal to about 120 $g/m^2$, greater than or equal to about 135 $g/m^2$, or greater than or equal to about 175 $g/m^2$. In some instances, the third layer may have a basis weight of less than or equal to about 200 $g/m^2$, less than or equal to about 150 $g/m^2$, less than or equal to about 130 $g/m^2$, less than or equal to about 110 $g/m^2$, less than or equal to about 100 $g/m^2$, or less than or equal to about 85 $g/m^2$. Combinations of the above-referenced ranges are also possible (e.g., a basis weight of greater than or equal to about 75 $g/m^2$ and less than or equal to about 150 $g/m^2$). Other values of basis weight are also possible. The basis weight may be determined according to the standard ISO 536.

The thickness of the third layer may be selected as desired. For instance, in some embodiments, the third layer may have a thickness of greater than or equal to about 0.1 mm, greater than or equal to about 0.2 mm, greater than or equal to about 0.3 mm, greater than or equal to about 0.4 mm, greater than or equal to about 0.5 mm, greater than or equal to about 1.0 mm, or greater than or equal to about 1.5 mm. In some instances, the third layer may have a thickness of less than or equal to about 2.0 mm, less than or equal to about 1.2 mm, less than or equal to about 0.5 mm, less than or equal to about 0.4 mm, less than or equal to about 0.3 mm, or less than or equal to about 0.2 mm. Combinations of the above-referenced ranges are also possible (e.g., a thickness of greater than or equal to about 0.2 mm and less than or equal to about 0.5 mm). Other values of thickness are also possible. The thickness may be determined according to the standard ISO 534 at 2 $N/cm^2$. The density of the third layer may also vary as desired. For instance, in some embodiments, the third layer may have a density of greater than or equal to about 0.5 $kg/m^3$, greater than or equal to about 0.75 $kg/m^3$, greater than or equal to about 0.9 $kg/m^3$, greater than or equal to about 1.05 $kg/m^3$, greater than or equal to about 1.15 $kg/m^3$, greater than or equal to about 1.35 $kg/m^3$, or greater than or equal to about 1.75 $kg/m^3$. In some instances, the third layer may have a density of less than or equal to about 2.0 $kg/m^3$, less than or equal to about 1.50 $kg/m^3$, less than or equal to about 1.25 $kg/m^3$, less than or equal to about 1.1 $kg/m^3$, less than or equal to about 1.0 $kg/m^3$, or less than or equal to about 0.85 $kg/m^3$. Combinations of the above-referenced ranges are also possible (e.g., a density of greater than or equal to about 0.75 $kg/m^3$ and less than or equal to about 1.25 $kg/m^3$). Other values of density are also possible. The density of the third layer may be calculated from the standards ISO 536 and ISO 534 at 2 $N/cm^2$.

The mean flow pore size may be selected as desired. For instance, in some embodiments, the third layer may have a mean flow pore size of greater than or equal to about 30 microns, greater than or equal to about 40 microns, greater than or equal to about 45 microns, greater than or equal to about 50 microns, greater than or equal to about 55 microns, greater than or equal to about 60 microns, greater than or equal to about 65 microns, or greater than or equal to about 70 microns. In some instances, the third layer may have an average mean flow pore size of less than or equal to about 80 microns, less than or equal to about 70 microns, less than or equal to about 60 microns, less than or equal to about 50 microns, or less than or equal to about 40 microns. Combinations of the above-referenced ranges are also possible (e.g., greater than or equal to about 50 microns and less than or equal to about 60 microns). Other values of average mean flow pore size are also possible. The mean flow pore size may be determined according to the standard ASTM E1294 (2008) (M.F.P.). In some embodiments, the third layer may have a larger mean flow pore size than that of the second layer.

The third layer (e.g., a support layer), as described herein, may have advantageous performance properties as described herein. For instance, in some embodiments, the third layer, which may optionally include a plurality of perforations as described herein, may have a relatively high dry Mullen Burst strength. The dry Mullen Burst strength may be, for example, greater than or equal to about 100 kPa, greater than or equal to about 200 kPa, greater than or equal to about 250 kPa, greater than or equal to about 300 kPa, greater than or equal to about 350 kPa, greater than or equal to about 400 kPa, greater than or equal to about 450 kPa, or greater than or equal to about 500 kPa. In some instances, the third layer may have a dry Mullen Burst strength of less than or equal to about 500 kPa, less than or equal to about 400 kPa, less than or equal to about 300 kPa, or less than or equal to about 200 kPa. Combinations of the above-referenced ranges are also possible (e.g., greater than or equal to about 100 kPa and less than or equal to about 500 kPa). Other values of dry Mullen Burst strength are also possible. The dry Mullen Burst strength may be determined according to the standard DIN 53141.

In some embodiments, the third layer (e.g., a support layer), which may optionally include a plurality of perforations as described herein, may have an air permeability greater than the air permeability of one or more other layers in the filter media. For example, the air permeability of the third layer, may be at least 10 times, at least 20 times, at least 30 times, at least 40 times, or at least 50 times greater than the air permeability of another layer in the filter media (e.g., the first, second, and/or fourth layer). In some cases, the air permeability of the third layer may be less than or equal to 100 times than the air permeability of another layer in the filter media (e.g., the first, second, and/or fourth layer). For instance, in some embodiments, the third layer may have an air permeability of greater than or equal to about 15 $L/m^2sec$, greater than or equal to about 200 $L/m^2sec$, greater than or equal to about 400 $L/m^2sec$, greater than or equal to about 600 $L/m^2sec$, greater than or equal to about 800 $L/m^2sec$, greater than or equal to about 1000 $L/m^2sec$, greater than or equal to about 1200 $L/m^2sec$, greater than or equal to about 1500 $L/m^2sec$, or greater than or equal to about 1800 $L/m^2sec$. In some instances, the third layer may have an air permeability of less than or equal to about 2000 $L/m^2sec$, less than or equal to about 1500 $L/m^2sec$, less than or equal to about 1000 $L/m^2sec$, or less than or equal to about 600 $L/m^2sec$. Combinations of the above-referenced ranges are also possible (e.g., an air permeability of greater than or equal to about 400 $L/m^2sec$ and less than or equal to about 800 $L/m^2sec$). Other values of air permeability are also possible. The air permeability may be determined according to standard EN/ISO 9327 (where the measurement area is 20 $cm^2$ at a 2 mbar differential pressure).

The pressure drop across the third layer, which may optionally include a plurality of perforations as described herein, may be selected as desired. For instance, in some embodiments, the third layer may have a pressure drop of less than or equal to about 50 Pa, less than or equal to about 35 Pa, less than or equal to about 28 Pa, less than or equal to about 22 Pa, less than or equal to about 16 Pa, less than or equal to about 10 Pa, less than or equal to about 5 Pa, or less than or equal to about 2 Pa. In some instances, the third layer may have a pressure drop of greater than or equal to about 1 Pa, greater than or equal to about 10 Pa, greater than or equal to about 20 Pa, greater than or equal to about 26 Pa, greater than or equal to about 30 Pa, or greater than or equal to about 40 Pa. Combinations of the above-referenced ranges are also possible (e.g., a pressure drop of greater than or equal to about 20 Pa and less than or equal to about 30 Pa). Other values of pressure drop are also possible. The pressure drop, as described herein, can be determined at 10.5 FPM face velocity using a TSI 8130 filtration tester.

In some embodiments, the third layer (e.g., a support layer), which may optionally include perforations as described herein, may have a relatively low efficiency compared to one or more other layers in the filter media. For instance, in some embodiments, the third layer may have an efficiency of less than or equal to about 50%, less than or equal to about 40%, less than or equal to about 30%, less than or equal to about 20%, less than or equal to about 10%, or less than or equal to about 2% The efficiency may be determined according to standard ISO 19438. As described in more detail below, efficiency can be measured at different particle sizes (e.g., for x micron or greater particles, where x is described below), and the above ranges of efficiency may be suitable for the various particle sizes described herein. In some embodiments, x is 4 microns such that the above ranges of efficiency are suitable for filtering out 4 micron or larger particles.

In some embodiments, the third layer may have a relatively low dust holding capacity compared to one or more other layers in the filter media. For instance, in some embodiments, the third layer may have a dust holding capacity of greater than or equal to about 3 $g/m^2$ (e.g., greater than or equal to about 10 $g/m^2$, greater than or equal to about 20 $g/m^2$, or greater than or equal to about 30 $g/m^2$) and/or less than or equal to about 40 $g/m^2$ (e.g., less than or equal to about 35 $g/m^2$, less than or equal to about 30 $g/m^2$, less than or equal to about 25 $g/m^2$ or less than or equal to about 20 $g/m^2$) The dust holding capacity may be determined according to standard ISO 19438.

The dust holding capacity and efficiency, as referred to herein, is tested based on a Multipass Filter Test following the ISO 19438 procedure on a Multipass Filter Test Stand manufactured by FTI. The test may be run under different conditions. The testing uses ISO 12103-A3 medium grade test dust at a base upstream gravimetric dust level (BUGL) of 50 mg/liter. The test fluid is Aviation Hydraulic Fluid AERO HFA MIL H-5606A manufactured by Mobil. The test is run at a face velocity of 0.06 cm/s until a terminal pressure of 100 kPa. Unless otherwise stated, the dust holding capacity values and/or efficiency values described herein are determined at a BUGL of 50 mg/L, a face velocity of 0.06 cm/s, and a terminal pressure of 100 kPa.

As described herein, in some embodiments, the third layer (e.g., support layer) may include cellulose fibers. The cellulose fibers may have an average diameter of, for example, greater than or equal to about 20 microns and less than or equal to about 50 microns (e.g., greater than or equal to about 30 microns and less than or equal to about 40 microns), and an average fiber length of, for example, greater than or equal to about 1 mm and less than or equal to about 10 mm. In some cases, the third layer may include a relatively high weight percentage of cellulose fibers (e.g., greater than or equal to 70 wt %, or greater than or equal to 95 wt % cellulose fibers). In one embodiment, the third layer may include 100 wt % cellulose fibers. The third layer may include perforations in some embodiments, but do not include perforations in other embodiments. When perforations are present, the perforations may cover a certain percentage of the surface area of the layer. For example, the perforations may cover greater than or equal to about 5% and less than or equal to about 20% of the surface area of the layer. The perforations may have a periodicity of, for example, greater than or equal to about 5 mm and less than or equal to about 20 mm. The average diameter of the perforations may be, for example, greater than or equal to about 0.5 mm and less than or equal to about 5 mm. In some instances, the third layer may be a single layer and may have a thickness of greater than or equal to about 0.1 mm and less than or equal to about 0.5 mm (e.g., greater than or equal to about 0.2 mm and less than or equal to about 0.4 mm). The basis weight of the third layer may be, for example, greater than or equal to about 75 $g/m^2$ and less than or equal to 150 $g/m^2$. The dry Mullen Burst strength of the third layer may be, for example, greater than or equal to about 100 kPa and less than or equal to about 500 kPa (e.g., greater than or equal to about 200 kPa and less than or equal to about 300 kPa). In some cases, the third layer may have a mean flow pore size of greater than 40 microns, for example, greater than or equal to 50 microns and less than or equal to 60 microns. The air permeability of the third layer may be, for example, greater than or equal to about 400 $L/m^2$sec and less than or equal to about 1500 $L/m^2$sec. In some instances, the third layer may have a higher mean flow pore size and/or a higher air permeability than those of the second layer.

As described herein, a filter media may include a first layer (e.g., a capacity layer). In some embodiments, the first layer functions to enhance the dust holding capacity of the filter media, and may be referred to as a capacity layer. In some embodiments, the first layer may include a plurality of fibers. In general, the materials that can be used to form the plurality of fibers of the first layer (e.g., a capacity layer) can vary as described below. In certain embodiments, the first layer may include one or more of a synthetic fiber, a bicomponent fiber, a cellulose fiber (e.g., natural cellulose, regenerated fibers), fibrillated fiber, and/or a glass fiber.

In some embodiments, in which synthetic fibers are included in the first layer, the weight percentage of synthetic fibers in the first layer may be greater than or equal to about 1%, greater than or equal to about 20%, greater than or equal to about 40%, greater than or equal to about 60%, greater than or equal to about 80%, greater than or equal to about 90%, or greater than or equal to about 95%. In some instances, the weight percentage of the synthetic fibers in the first layer may be less than or equal to about 100%, less than or equal to about 98%, less than or equal to about 85%, less than or equal to about 75%, less than or equal to about 50%, or less than or equal to about 10%. Combinations of the above-referenced ranges are also possible (e.g., greater than or equal to about 80% and less than or equal to about 100%). Other values of weight percentage of synthetic fibers in the first layer are also possible. In some embodiments, the first layer contains 100% synthetic fibers. In other embodiments, the first layer contains 0% synthetic fibers.

In some embodiments, in which bicomponent fibers are included in the first layer, the weight percentage of bicomponent fibers in the first layer may be greater than or equal to about 1%, greater than or equal to about 20%, greater than or equal to about 40%, greater than or equal to about 60%, greater than or equal to about 80%, greater than or equal to about 90%, or greater than or equal to about 95%. In some instances, the weight percentage of bicomponent fibers in the first layer may be less than or equal to about 100%, less than or equal to about 98%, less than or equal to about 85%, less than or equal to about 75%, less than or equal to about 50%, less than or equal to about 10%, less than or equal to about 5%, or less than or equal to about 3%. Combinations of the above-referenced ranges are also possible (e.g., greater than or equal to about 80% and less than or equal to about 100%). Other values of weight percentage of bicomponent fibers in the first layer are also possible. In some embodiments, the first layer contains 100% bicomponent fibers. In other embodiments, the first layer contains 0% bicomponent fibers.

In some embodiments, in which cellulose fibers are included in the first layer, the weight percentage of cellulose fibers in the first layer may be greater than or equal to about 1%, greater than or equal to about 10%, greater than or equal to about 25%, greater than or equal to about 50%, greater than or equal to about 75%, or greater than or equal to about 90%. In some instances, the weight percentage of cellulose fibers in the first layer may be less than or equal to about 100%, less than or equal to about 70%, less than or equal to about 50%, less than or equal to about 30%, less than or equal to about 15%, or less than or equal to about 5%. Combinations of the above-referenced ranges are also possible (e.g., greater than or equal to about 1% and less than or equal to about 5%). Other values of weight percentage of cellulose fibers in the first layer are also possible. In some embodiments, the first layer contains 100% cellulose fibers. In other embodiments, the first layer contains 0% cellulose fibers.

In some embodiments, in which fibrillated fibers are included in the first layer, the weight percentage of fibrillated fibers in the first layer may be greater than or equal to about 1%, greater than or equal to about 10%, greater than or equal to about 25%, greater than or equal to about 50%, greater than or equal to about 75%, or greater than or equal to about 90%. In some instances, the weight percentage of fibrillated fibers in the first layer may be less than or equal to about 100%, less than or equal to about 70%, less than or equal to about 50%, less than or equal to about 30%, less than or equal to about 10%, or less than or equal to about 2%. Combinations of the above-referenced ranges are also possible (e.g., greater than or equal to about 1% and less than or equal to about 10%). Other values of weight percentage of the fibrillated fibers in the first layer are also possible. In some embodiments, the first layer contains 100% fibrillated fibers. In other embodiments, the first layer contains 0% fibrillated fibers.

In some embodiments, in which glass fibers are included in the first layer, the weight percentage of glass fibers (e.g., microglass fibers, chopped strand glass fibers, or a combination thereof) in the first layer may be greater than or equal to about 1%, greater than or equal to about 10%, greater than or equal to about 25%, greater than or equal to about 50%, greater than or equal to about 75%, or greater than or equal to about 90%. In some instances, the weight percentage of glass fibers in the first layer may be less than or equal to about 100%, less than or equal to about 70%, less than or equal to about 50%, less than or equal to about 30%, less than or equal to about 10%, or less than or equal to about 2%. Combinations of the above-referenced ranges are also possible (e.g., greater than or equal to about 1% and less than or equal to about 10%). Other values of weight percentage of the glass fibers in the first layer are also possible. In some embodiments, the first layer contains 100% glass fibers. In other embodiments, the first layer contains 0% glass fibers.

Regardless of the type of fibers used to form the first layer, in some embodiments, the average diameter of the fibers of the first layer may be, for example, greater than or equal to about 1 micron, greater than or equal to about 3 microns, greater than or equal to about 5 microns, greater than or equal to about 8 microns, greater than or equal to about 10 microns, greater than or equal to about 12 microns, greater than or equal to about 15 microns, greater than or equal to about 20 microns, greater than or equal to about 30 microns, or greater than or equal to about 40 microns. In some instances, the fibers of the first layer may have an average diameter of less than or equal to about 50 microns, less than or equal to about 40 microns, less than or equal to about 30 microns, less than or equal to about 20 microns, less than or equal to about 15 microns, less than or equal to about 10 microns, less than or equal to about 7 microns, less than or equal to about 5 microns, or less than or equal to about 2 microns. Combinations of the above-referenced ranges are also possible (e.g., greater than or equal to about 1 micron and less than or equal to about 5 microns). Other values of average fiber diameter are also possible.

In certain embodiments, the first layer may include a single layer. In other embodiments, however, a first layer may include more than one layer (i.e., sub-layers) to form a multi-layered structure. When a layer includes more than one sub-layer, the plurality of sub-layers may differ based on certain features such as resistance and/or gradient structure. In certain cases, the plurality of sub-layers may be discrete and combined by any suitable method, such as lamination, point bonding, or collating. In some embodiments, the sub-layers are substantially joined to one another (e.g., by lamination, point bonding. thermo-dot bonding, ultrasonic bonding, calendering, use of adhesives (e.g., glue-web), and/or co-pleating).

In other cases, sub-layers may be formed as a composite layer (e.g., by a wet laid process) or a multi-layer gradient structure. In one example of a first layer including sub-layers, a sub-layer including a plurality of synthetic fibers may be combined with a sub-layer including glass fibers. In another example, a first layer may include a plurality of sub-layers (e.g., three sub-layers), each sub-layer including meltblown synthetic fibers. In some cases, each layer includes meltblown synthetic fibers having an average diameter of greater than or equal to 1 micron. Other values of average diameter are also possible, as described herein. Each of the sub-layers of the first layer may have any suitable basis weight and/or thickness, such as those basis weights and thicknesses described herein for the first layer. Additionally, each of the sub-layers of the first layer may have performance characteristics (e.g., dust holding capacity, air permeability, and pressure drop) of those described herein for the first layer. The number of sub-layers within the first layer may be selected as desired. For instance, in some embodiments, the first layer may include, 1, 2, 3, 4, 5, etc. sub-layer. Other values for the number of sub-layers in the first layer are also possible.

A gradient across a layer (or across sub-layers) of a filter media may include a change in one or more properties such as fiber diameter, fiber type, fiber composition, fiber length, fiber surface chemistry, pore size, material density, basis weight, a proportion of a component (e.g., a binder, resin, crosslinker), and strength across a portion, or all of, a thickness of the layer or sub-layers. A layer (or sub-layers) may optionally include a gradient in one or more performance characteristics such as efficiency, dust holding capacity, pressure drop, and air permeability across the thickness of the layer (or sub-layers).

Different types and configurations of gradients are possible within a layer (or sub-layers). In some embodiments, a gradient in one or more properties is gradual (e.g., linear, curvilinear) between a top surface and a bottom surface of the layer (or sub-layers). For example, a layer (or sub-layers) may have an increasing basis weight from the top surface to the bottom surface of the layer (or sub-layers). In another embodiment, a layer (or sub-layers) may include a step gradient in one more properties across the thickness of the layer (or sub-layers). In one such embodiment, the transition in the property may occur primarily at an interface between two layers (or sub-layers). For example, a filter media, e.g., having a first layer (or sub-layer) including a first fiber type and a second layer (or sub-layer) including a second fiber type, may have an abrupt transition between fiber types across the interface. In other words, each of the layers (or sub-layers) of the fiber web may be relatively distinct. In other embodiments, a gradient is characterized by a type of function across the thickness of the layer (or sub-layers). For example a gradient may be characterized by a sine function, a quadratic function, a periodic function, an aperiodic function, a continuous function, or a logarithmic function across the layer (or sub-layers). Other types of gradients are also possible.

In some embodiments, the first layer (e.g., a capacity layer) may be a certain weight percentage of the entire filter media. In general, the first layer may be any suitable weight percentage of the entire filter media. For instance, in some embodiments, the weight percentage of the first layer in the entire filter media may be greater than or equal to about 5%, greater than or equal to about 10%, greater than or equal to about 20%, greater than or equal to about 30%, greater than or equal to about 40%, greater than or equal to about 50%, greater than or equal to about 60%, or greater than or equal to about 70%. In some instances, the weight percentage of the first layer in the entire filter media may be less than or equal to about 80%, less than or equal to about 60%, less than or equal to about 50%, less than or equal to about 40%, less than or equal to about 30%, less than or equal to about 20%, or less than or equal to about 10%. Combinations of the above-referenced ranges are also possible (e.g., a weight percentage of greater than or equal to about 10% and less than or equal to about 30%). Other values of weight percentage of the first layer in the entire filter media are also possible.

The first layer (e.g., a capacity layer), as described herein, may have certain structural characteristics, such as basis weight and thickness. For instance, in some embodiments, the first layer may have a basis weight of greater than or equal to about 30 g/m$^2$, greater than or equal to about 60 g/m$^2$, greater than or equal to about 70 g/m$^2$, greater than or equal to about 90 g/m$^2$, greater than or equal to about 120 g/m$^2$, greater than or equal to about 150 g/m$^2$, or greater than or equal to about 180 g/m$^2$. In some instances, the first layer may have a basis weight of less than or equal to about 200 g/m$^2$, less than or equal to about 150 g/m$^2$, less than or equal to about 90 g/m$^2$, less than or equal to about 70 g/m$^2$, less than or equal to about 60 g/m$^2$, or less than or equal to about 40 g/m$^2$. Combinations of the above-referenced ranges are also possible (e.g., greater than or equal to about 60 g/m$^2$ and less than or equal to about 90 g/m$^2$). Other values of basis weight are also possible. The basis weight may be determined according to the standard ISO 536.

The thickness of the first layer may be selected as desired. For instance, in some embodiments, the first layer may have a thickness of greater than or equal to about 0.2 mm, greater than or equal to about 0.5 mm, greater than or equal to about 0.8 mm, greater than or equal to about 1 mm, greater than or equal to about 1.2 mm, greater than or equal to about 1.5 mm, or greater than or equal to about 1.8 mm. In some instances, the first layer may have a thickness of less than or equal to about 2.0 mm, less than or equal to about 1.6 mm, less than or equal to about 1.2 mm, less than or equal to about 0.9 mm, less than or equal to about 0.6 mm, or less than or equal to about 0.4 mm. Combinations of the above-referenced ranges are also possible (e.g., greater than or equal to about 0.5 mm and less than or equal to about 0.9 mm). Other values of average thickness are also possible. The thickness may be determined according to the standard ISO 534 at 2 N/m$^2$.

In some embodiments, the first layer may have a mean flow pore size of greater than or equal to about 30 microns, greater than or equal to about 40 microns, greater than or equal to about 50 microns, greater than or equal to about 60 microns, greater than or equal to about 70 microns, greater than or equal to about 80 microns, or greater than or equal to about 90 microns. In some instances, the first layer may have an average mean flow pore size of less than or equal to about 100 microns, less than or equal to about 90 microns, less than or equal to about 80 microns, less than or equal to about 70 microns, less than or equal to about 60 microns, less than or equal to about 50 microns, or less than or equal to about 40 microns. Combinations of the above-referenced ranges are also possible (e.g., greater than or equal to about 40 microns and less than or equal to about 90 microns). Other values of average mean flow pore size are also possible. The mean flow pore size may be determined according to the standard ASTM E1294 (2008) (M.F.P.). In some embodiments, the first layer may have a larger mean flow pore size than that of the second layer.

The first layer, as described herein, may have advantageous performance properties, including dust holding capacity, air permeability, and pressure drop. For instance, in some embodiments, the first layer (e.g., a capacity layer) may have a relatively high dust holding capacity. For instance, in some embodiments, the first layer may have a dust holding capacity of greater than or equal to about 5 g/m$^2$, greater than or equal to about 30 g/m$^2$, greater than or equal to about 50 g/m$^2$, greater than or equal to about 70 g/m$^2$, greater than or equal to about 90 g/m$^2$, greater than or equal to about 110 g/m$^2$, greater than or equal to about 150 g/m$^2$, greater than or equal to about 200 g/m$^2$, or greater than or equal to about 250 g/m$^2$, greater than or equal to about 300 g/m$^2$, or greater than or equal to about 350 g/m$^2$. In some instances, the capacity layer may have a dust holding capacity of less than or equal to about 400 g/m$^2$, less than or equal to about 300 g/m$^2$, less than or equal to about 200 g/m$^2$, less than or equal to about 100 g/m$^2$, or less than or equal to about 80 g/m$^2$. Combinations of the above-referenced ranges are also possible (e.g., greater than or equal to about 30 g/m$^2$ and less than or equal to about 100 g/m$^2$). The dust holding capacity may be determined according to standard ISO 19438.

In some embodiments, the first layer may have an air permeability higher than an air permeability of another layer in the filter media. In one example, the first layer (e.g., a capacity layer) may have an air permeability higher than that of the second layer (e.g., efficiency layer). For instance, in some embodiments, the first layer may have an air permeability of greater than or equal to about 100 L/m$^2$sec, greater than or equal to about 150 L/m$^2$sec, greater than or equal to about 350 L/m$^2$sec, greater than or equal to about 550 L/m$^2$sec, greater than or equal to about 750 L/m$^2$sec, greater than or equal to about 1000 L/m$^2$sec, greater than or equal to about 1500 L/m$^2$sec, or greater than or equal to about 1700 L/m$^2$sec. In some instances, the first layer may have an air permeability of less than or equal to about 2000 L/m$^2$sec, less than or equal to about 1600 L/m$^2$sec, less than or equal to about 1200 L/m$^2$sec, less than or equal to about 900 L/m$^2$sec, less than or equal to about 650 L/m$^2$sec, less than or equal to about 400 L/m$^2$sec, or less than or equal to about 200 L/m$^2$sec. Combinations of the above-referenced ranges are also possible (e.g., greater than or equal to about 150 L/m$^2$sec and less than or equal to about 900 L/m$^2$sec). Other values of air permeability are also possible. The air permeability may be determined according to standard EN/ISO 9327 (where the measurement area is 20 cm$^2$ at a 2 mbar differential pressure).

The pressure drop of the first layer may be selected as desired. For instance, in some embodiments, the first layer may have a pressure drop of greater than or equal to about 5 Pa, greater than or equal to about 15 Pa, greater than or equal to about 25 Pa, greater than or equal to about 35 Pa, greater than or equal to about 45 Pa, greater than or equal to about 65 Pa, or greater than or equal to about 85 Pa. In some instances, the first layer may have a pressure drop of less than or equal to about 100 Pa, less than or equal to about 75 Pa, less than or equal to about 50 Pa, less than or equal to about 40 Pa, less than or equal to about 30 Pa, or less than or equal to about 10 Pa. Combinations of the above-referenced ranges are also possible (e.g., greater than or equal to about 15 Pa and less than or equal to about 50 Pa). Other values of pressure drop are also possible. The pressure drop, as described herein, can be determined at 10.5 FPM face velocity using a TSI 8130 filtration tester.

As described herein, in some embodiments, the first layer (e.g., capacity layer) may include synthetic fibers with an average fiber diameter of greater than or equal to about 1 micron (e.g., greater than or equal to 1 micron and less than or equal to about 5 microns). In some embodiments in which the first layer includes synthetic fibers, the synthetic fibers may be formed by a meltblown process or a centrifugal spinning process, and may have a continuous length. In some cases, the first layer may include more than one sub-layer (e.g., 2-5 sub-layers). For example, the first layer may include three sub-layers and each sub-layer may include synthetic fibers formed by a meltblown process or a centrifugal spinning process. In some cases, each sub-layer in the first layer may include a relatively high weight percentage of synthetic fibers (e.g., greater than or equal to about 70 wt %, greater than or equal to about 95 wt % synthetic fibers). Each sub-layer may contain, for instance, 100 wt % of synthetic fibers. The sub-layers in the first layer may be arranged to produce a gradient in a particular property (e.g., fiber diameter) across the first layer, as described herein. The first layer may have a basis weight of, for example, greater than or equal to about 30 g/m$^2$ and less than or equal to about 150 g/m$^2$ (e.g., greater than or equal to about 60 g/m$^2$ and less than or equal to about 90 g/m$^2$) and a thickness of, for example, greater than equal to about 0.3 mm and less than or equal to about 1.5 mm (e.g., greater than equal to about 0.5 mm and less than or equal to about 0.9 mm). In some cases, the first layer may have a mean flow pore size of greater than or equal to about 70 microns; for example, greater than or equal to about 80 microns and less than or equal to about 90 microns. In some cases, the first layer may have an air permeability of, for example, greater than or equal to about 150 L/m$^2$sec and less than or equal to about 900 L/m$^2$sec. In some instances, the first layer may have a higher mean flow pore size and/or a higher air permeability than those of the second layer.

As noted above, the filter media may include a second layer. In some embodiments, the second layer functions to enhance particle capture efficiency of the filter media, and may be referred to as an efficiency layer. Typically, the efficiency layer does not include a spacer layer (e.g., spun-bond layer) when referring to the structural and performance characteristics of the efficiency layer, and/or the number of layers within the efficiency layer.

In some embodiments, the second layer may include more than one type of fiber. For example, in certain embodiments, the second layer may include one or more of a synthetic fiber, a bicomponent fiber, a cellulose fiber (e.g., regenerated, Lyocell, etc.), fibrillated fiber, and/or a glass fiber as described herein.

In some embodiments, in which synthetic fibers are included in the second layer, the weight percentage of synthetic fibers in the second layer may be greater than or equal to about 1%, greater than or equal to about 20%, greater than or equal to about 40%, greater than or equal to about 60%, greater than or equal to about 80%, greater than or equal to about 90%, or greater than or equal to about 95%. In some instances, the weight percentage of synthetic fibers in the second layer may be less than or equal to about 100%, less than or equal to about 98%, less than or equal to about 85%, less than or equal to about 75%, less than or equal to about 50%, or less than or equal to about 10%. Combinations of the above-referenced ranges are also possible (e.g., greater than or equal to about 80% and less than or equal to about 100%). Other values of weight percentage of synthetic fibers in the second layer are also possible. In some embodiments, the second layer includes 100% synthetic fibers. In other embodiments, the second layer may include 0% synthetic fibers.

In some embodiments, in which bicomponent fibers are included in the second layer, the second layer may optionally include bicomponent fibers. For instance, in some embodiments, the weight percentage of bicomponent fibers in the second layer may be, for example, greater than or equal to about 1%, greater than or equal to about 10%, greater than or equal to about 25%, greater than or equal to about 50%, or greater than or equal to about 75%. In some instances, the weight percentage of bicomponent fibers in the second efficiency layer may be less than or equal to about 100%, less than or equal to about 75%, less than or equal to about 50%, less than or equal to about 25%, less than or equal to about 5%, or less than or equal to about 2%. Combinations of the above-referenced ranges are also possible (e.g., greater than or equal to about 1% and less than or equal to about 10%). Other values of weight percentage of the bicomponent fibers in the second layer are also possible. In some embodiments, the second layer includes 100% bicomponent fibers. In other embodiments, the second layer may include 0% bicomponent fibers.

In certain embodiments, the second layer may optionally include cellulose fibers, such as regenerated cellulose (e.g., rayon, Lyocell), fibrillated synthetic fibers, microfibrillated cellulose, natural fibers (e.g., hardwood, softwood), etc. For instance, in some embodiments, the weight percentage of cellulose fibers in the second layer may be greater than or equal to about 1%, greater than or equal to about 5%, greater than or equal to about 10%, greater than or equal to about 15%, greater than or equal to about 45%, greater than or equal to about 65%, or greater than or equal to about 90%. In some instances, the weight percentage of the cellulose fibers in the second layer may be less than or equal to about 100%, less than or equal to about 85%, less than or equal to about 55%, less than or equal to about 20%, less than or equal to about 10%, or less than or equal to about 2%. Combinations of the above-referenced ranges are also possible (e.g., greater than or equal to about 1% and less than or equal to about 20%). Other values of weight percentage of the cellulose fibers in the second layer are also possible. In some embodiments, the second layer includes 100% cellulose fibers. In other embodiments, the second layer may include 0% cellulose fibers.

In certain embodiments, the second layer may optionally include fibrillated fibers, such as fibrillated regenerated cellulose (e.g., rayon, Lyocell), microfibrillated cellulose, fibrillated synthetic fibers, fibrillated natural fibers (e.g., hardwood, softwood), etc. For instance, in some embodiments, the weight percentage of fibrillated fibers in the second layer may be greater than or equal to about 1%, greater than or equal to about 5%, greater than or equal to about 10%, greater than or equal to about 15%, greater than or equal to about 45%, greater than or equal to about 65%, or greater than or equal to about 90%. In some instances, the weight percentage of the fibrillated fibers in the second layer may be less than or equal to about 100%, less than or equal to about 85%, less than or equal to about 55%, less than or equal to about 20%, less than or equal to about 10%, or less than or equal to about 2%. Combinations of the above-referenced ranges are also possible (e.g., greater than or equal to about 1% and less than or equal to about 20%). Other values of weight percentage of the fibrillated fibers in the second layer are also possible. In some embodiments, the second layer includes 100% fibrillated fibers. In other embodiments, the second layer may include 0% fibrillated fibers.

In other embodiments, the second layer may optionally include glass fibers (e.g., microglass and/or chopped glass fibers). For instance, in some embodiments, the weight percentage of the glass fibers in the second layer may be, for example, greater than or equal to about 0%, greater than or equal to about 10%, greater than or equal to about 25%, greater than or equal to about 50%, or greater than or equal to about 75%. In some instances, the weight percentage of the glass fibers in the second layer may be less than or equal to about 100%, less than or equal to about 75%, less than or equal to about 50%, less than or equal to about 25%, less than or equal to about 5%, or less than or equal to about 2%. Combinations of the above-referenced ranges are also possible (e.g., greater than or equal to about 0% and less than or equal to about 2%). Other values of weight percentage of the glass in the second layer are also possible. In some embodiments, the second layer includes 100% glass fibers. In other embodiments, the second layer may include 0% glass fibers.

Regardless of the type of fiber used to form the second layer, in some embodiments, the average diameter of the fibers of the second layer may be relatively small. In some cases, the second layer includes nanofibers and/or microfibers. For instance, the plurality of fibers in the second layer may have an average diameter of, for example, less than or equal to about 1.5 microns, less than or equal to about 1.2 microns, less than or equal to about 1.0 microns, less than or equal to about 0.8 microns, less than or equal to about 0.6 microns, less than or equal to about 0.4 microns, or less than or equal to about 0.2 microns. In certain embodiments, the fibers of the second layer may have an average diameter of greater than or equal to about 0.1 microns, greater than or equal to about 0.3 microns, greater than or equal to about 0.5 microns, or greater than or equal to about 0.8 microns. Combinations of the above-referenced ranges are also possible (e.g., less than or equal to about 0.5 microns and greater than or equal to about 0.2 microns). Other values of average fiber diameter are also possible.

In other embodiments, the second layer may include a mixture of fibers having an average fiber diameter of less than or equal to 1.5 microns, and larger, micron-sized fibers (e.g., fibrillated fibers). In such embodiments, the average diameter of the fibers of the second layer may be, for example, less than or equal to about 50 microns, less than or equal to about 40 microns, less than or equal to about 30 microns, less than or equal to about 20 microns, or less than or equal to about 10 microns. In certain embodiments, the fibers of the second layer may have an average diameter of greater than or equal to about 1.5 microns, greater than or equal to about 5 microns, greater than or equal to about 10 microns, greater than or equal to about 20 microns, greater than or equal to about 30 microns, or greater than or equal to about 40 microns. Combinations of the above-referenced ranges are also possible (e.g., less than or equal to about 10 microns and greater than or equal to about 1.5 microns). Other values of average fiber diameter are also possible.

In some embodiments, the fibers in the second layer may also have an average length which may depend on the method of formation of the fibers. For instance, in some embodiments, fibers formed by a melt-blown process may be continuous.

In certain embodiments, the second layer (e.g., an efficiency layer) may include a single layer. In other embodiments, however, a second layer may include more than one layer (i.e., sub-layers) to form a multi-layered structure. When a layer includes more than one sub-layer, the plurality of sub-layers may differ based on certain features such as air permeability, basis weight, fiber type, efficiency, and/or calendered design. In certain cases, the plurality of sub-layers may be discrete and combined by any suitable method, such as lamination, point bonding, or collating. In some embodiments, the sub-layers are substantially joined to one another (e.g., by lamination, point bonding. thermo-dot bonding, ultrasonic bonding, calendering, use of adhesives (e.g., glue-web), and/or co-pleating). In some cases, sub-layers may be formed as a composite layer (e.g., by a wet laid process).

In one example of a second layer (e.g., an efficiency layer) including sub-layers, a sub-layer including a plurality of synthetic fibers may be combined with (e.g., positioned on top of) a sub-layer including glass fibers. In another example, a sub-layer including cellulose fibers (e.g., Lyocell fibers) may be combined with a sub-layer including synthetic fibers (e.g., a polybutylene terephthalate). In some embodiments, the second layer may be formed by a plurality of sub-layers including synthetic nanofibers and may optionally include a spunbond layer. Each of the sub-layers of the second layer may have any suitable basis weight and/or thickness, such as those basis weights and thicknesses described herein for the first layer. Additionally, each of the sub-layers of the second layer may have performance characteristics (e.g., dust holding capacity, air permeability, and pressure drop) of those described herein for the first layer. The number of sub-layers within the second layer may be selected as desired. For instance, in some embodiments, the second layer may include, 1, 2, 3, 4, 5, 6, etc. sub-layers. Other values for the number of sub-layers in the second layer are also possible.

In general, the second layer (e.g., an efficiency layer) may be any suitable weight percentage of the entire filter media. For instance, in some embodiments, the weight percentage of the second layer in the entire filter media may be greater than or equal to about 2%, greater than or equal to about 10%, greater than or equal to about 15%, greater than or equal to about 20%, greater than or equal to about 25%, greater than or equal to about 30%, greater than or equal to about 40%, or greater than or equal to about 50%. In some instances, the weight percentage of the second layer in the entire filter media may be less than or equal to about 60%, less than or equal to about 50%, less than or equal to about 40%, less than or equal to about 30%, less than or equal to about 20%, less than or equal to about 15%, or less than or equal to about 5%. Combinations of the above-referenced ranges are also possible (e.g., a weight percentage of greater than or equal to about 10% and less than or equal to about 30%). Other values of weight percentage of the second layer in the entire filter media are also possible.

The second layer (e.g., an efficiency layer), as described herein, may have certain structural characteristics such as basis weight and mean pore flow size. For instance, in some embodiments, the second layer may have a basis weight of greater than or equal to about 0.5 g/m$^2$, greater than or equal to about 5 g/m$^2$, greater than or equal to about 15 g/m$^2$, greater than or equal to about 20 g/m$^2$, greater than or equal to about 30 g/m$^2$, greater than or equal to about 40 g/m$^2$, greater than or equal to about 50 g/m$^2$, greater than or equal to about 60 g/m$^2$, or greater than or equal to about 70 g/m$^2$. In some instances, the second layer may have a basis weight of less than or equal to about 100 g/m$^2$, less than or equal to about 80 g/m$^2$, less than or equal to about 60 g/m$^2$, less than or equal to about 50 g/m$^2$, less than or equal to about 40 g/m$^2$, less than or equal to about 30 g/m$^2$, less than or equal to about 25 g/m$^2$, less than or equal to about 20 g/m$^2$, less than or equal to about 10 g/m$^2$, or less than or equal to about 5 g/m$^2$. Combinations of the above-referenced ranges are also possible (e.g., greater than or equal to about 10 g/m$^2$ and less than or equal to about 25 g/m$^2$). Other values of basis weight are also possible. The basis weight may be determined according to the standard ISO 536.

The mean flow pore size may be selected as desired. For instance, in some embodiments, the second layer may have an average mean flow pore size of greater than or equal to about 1 microns, greater than or equal to about 3 microns, greater than or equal to about 4 microns, greater than or equal to about 5 microns, greater than or equal to about 6 microns, greater than or equal to about 7 microns, or greater than or equal to about 9 microns. In some instances, the second layer may have an average mean flow pore size of less than or equal to about 10 microns, less than or equal to about 8 microns, less than or equal to about 6 microns, less than or equal to about 5 microns, less than or equal to about 4 microns, or less than or equal to about 2 microns. Combinations of the above-referenced ranges are also possible (e.g., greater than or equal to about 3 microns and less than or equal to about 6 microns). Other values of average mean flow pore size are also possible. The mean flow pore size may be determined according to the standard ASTM E1294 (2008) (M.F.P.). In some embodiments, the second layer may have a mean flow pore size that is smaller than the mean flow pore sizes of the first and third layers.

The second layer (e.g., efficiency layer), as described herein, may have advantageous performance properties, including efficiency, air permeability, pressure drop, and dust holding capacity. In some embodiments, the second layer may have a relatively high efficiency. For instance, in some embodiments, the efficiency of the second layer may be greater than or equal to about 80%, greater than or equal to about 90%, greater than or equal to about 95%, greater than or equal to about 96%, greater than or equal to about 97 greater than or equal to about 98, greater than or equal to about 99%, or greater than or equal to about 99.9%. In some instances, the efficiency of the second layer may be less than or equal to about 99.99%, less than or equal to about 98%, less than or equal to about 97%, less than or equal to about 96%, or less than or equal to about 90%. Combinations of the above-referenced ranges are also possible (e.g., greater than or equal to about 80% and less than or equal to about 99.99%). Other values of the efficiency of the second layer are also possible. The efficiency may be determined according to standard ISO 19438. As described in more detail below, efficiency can be measured at different particle sizes (e.g., for x micron or greater particles, where x is described below), and the above ranges of efficiency may be suitable for the various particle sizes described herein. In some embodiments, x is 4 microns such that the above ranges of efficiency are suitable for filtering out 4 micron or larger particles.

In some embodiments, the second layer may have an air permeability lower than that of another layer in the filter media; for example, the air permeability of the second layer may be lower than that of the first and/or third layers. For instance, in some embodiments, the second layer may have an air permeability of less than or equal to about 500 L/m²sec, less than or equal to about 300 L/m²sec, less than or equal to about 125 L/m²sec, less than or equal to about 110 L/m²sec, less than or equal to about 90 L/m²sec, or less than or equal to about 65 L/m²sec. In some instances, the second layer may have an air permeability of greater than or equal to about 50 L/m²sec, greater than or equal to about 75 L/m²sec, greater than or equal to about 85 L/m²sec, greater than or equal to about 95 L/m²sec, greater than or equal to about 115 L/m²sec, greater than or equal to about 200 L/m²sec, or greater than or equal to about 300 L/m²sec. Combinations of the above-referenced ranges are also possible (e.g., greater than or equal to about 75 L/m²sec and less than or equal to about 125 L/m²sec). Other values of air permeability are also possible. The air permeability may be determined according to standard EN/ISO 9327 (where the measurement area is 20 cm² at a 2 mbar differential pressure).

The pressure drop of the second layer may be selected as desired. For instance, in some embodiments, the second layer may have a pressure drop of greater than or equal to about 25 Pa, greater than or equal to about 60 Pa, greater than or equal to about 90 Pa, greater than or equal to about 100 Pa, greater than or equal to about 110 Pa, greater than or equal to about 150 Pa, or greater than or equal to about 180 Pa. In some instances, the second layer may have a pressure drop of less than or equal to about 200 Pa, less than or equal to about 165 Pa, less than or equal to about 140 Pa, less than or equal to about 120 Pa, less than or equal to about 105 Pa, less than or equal to about 75 Pa, or less than or equal to about 40 Pa. Combinations of the above-referenced ranges are also possible (e.g., greater than or equal to about 90 Pa and less than or equal to about 120 Pa). Other values of pressure drop are also possible. The pressure drop, as described herein, can be determined at 10.5 FPM face velocity using a TSI 8130 filtration tester.

In some embodiments, the second layer may have a certain dust holding capacity. For instance, in some embodiments, the second layer may have a dust holding capacity of greater than or equal to about 3 g/m², greater than or equal to about 10 g/m², greater than or equal to about 15 g/m², greater than or equal to about 20 g/m², greater than or equal to about 25 g/m², greater than or equal to about 30 g/m², or greater than or equal to about 35 g/m². In some instances, the second layer may have an air permeability of less than or equal to about 40 g/m², less than or equal to about 30 g/m², less than or equal to about 25 g/m², less than or equal to about 20 g/m², less than or equal to about 15 g/m², less than or equal to about 10 g/m², or less than or equal to about 5 g/m². Combinations of the above-referenced ranges are also possible (e.g., greater than or equal to about 15 g/m² and less than or equal to about 30 g/m²). Other values of dust holding capacity are also possible. The dust holding capacity may be determined according to standard ISO 19438.

As described herein, in some embodiments, the second layer (e.g., efficiency layer) may include synthetic fibers with an average fiber diameter of less than about or equal to about 1.5 microns (e.g., greater than or equal to about 0.2 microns and less than or equal to about 0.5 microns, or greater than or equal to about 0.2 microns and less than or equal to about 1 micron). In some embodiments in which the first layer includes synthetic fibers, the synthetic fibers may be formed by a meltblown process or a centrifugal spinning process, and may have a continuous length. In some cases, the second layer may include more than one sub-layer (e.g., 2-5 sub-layers). For example, the first layer may include two sub-layers and each sub-layer may include synthetic fibers formed by a meltblown process or a centrifugal spinning process. In some cases, each sub-layer in the second layer may include a relatively high weight percentage of synthetic fibers (e.g., greater than or equal to about 70 wt %, or greater than or equal to about 95 wt % synthetic fibers). In some embodiments, each sub-layer may contain 100 wt % of synthetic fibers. The sub-layers in the second layer may be arranged to produce a gradient in a particular property (e.g., fiber diameter) across the second layer, as described herein. The second layer may have a basis weight of, for example, greater than or equal to about 10 g/m² and less than or equal to about 30 g/m² (e.g., greater than or equal to about 15 g/m² and less than or equal to about 20 g/m²). In embodiments in which the first layer includes sub-layers, each sub-layer may have a basis weight within these ranges. In some cases, the second layer may have a mean flow pore size of greater than or equal to about 1 micron and less than or equal to about 10 microns. In some embodiments, the second layer may have an air permeability of greater than or equal to about 75 L/m²sec and less than or equal to about 125 L/m²sec. In some instances, the second layer may have a smaller mean flow pore size and/or a lower air permeability than those of the first and third layers. The second layer may optionally be joined to a fourth layer (e.g., a spun-bond layer), such that the second and fourth layers are between the first and third layers.

As described herein, a filter media may include a first, a second, a third, and a fourth layer. In some embodiments, the fourth layer may be a spacer layer adjacent to a second layer (e.g., an efficiency layer). In some cases, the fourth layer may be positioned between the second and third layers. In general, the fourth layer may be formed by any suitable process, such as a spun-bond process, a meltblown process, or a centrifugal spinning process. In some cases, staple fibers can be used. The fourth layer may be formed of any suitable material, such as a synthetic polymer (e.g., polypropylene, polybutylene terephthalate, polyester, polycarbonate, polyamide, polyaramid, polyimide, polyethylene, polyether ether ketone, polyolefin, nylon, acrylics, polyvinyl alcohol, and combinations thereof). In some instances, regenerated cellulose (e.g., lyocell, rayon) fibers can be used. In some embodiments, the synthetic fibers are organic polymer fibers. Synthetic fibers may also include multi-component fibers (i.e., fibers having multiple compositions such as bicomponent fibers). In some cases, synthetic fibers may include meltblown fibers or fibers formed by a centrifugal spinning process, which may be formed of polymers described herein (e.g., polyester, polypropylene). Other processes and materials used to form the spacer layer are also possible.

In some embodiments, the fourth layer may have a relatively low basis weight. For instance, in some embodiments, the fourth layer may have a basis weight of less than or equal to about 70 $g/m^2$, less than or equal to about 50 $g/m^2$, less than or equal to about 30 $g/m^2$, less than or equal to about 20 $g/m^2$, less than or equal to about 15 $g/m^2$, or less than or equal to about 10 $g/m^2$. In some instances, the fourth layer may have a basis weight of greater than or equal to about 5 $g/m^2$, greater than or equal to about 12 $g/m^2$, greater than or equal to about 20 $g/m^2$, greater than or equal to about 45 $g/m^2$, or greater than or equal to about 60 $g/m^2$. Combinations of the above-referenced ranges are also possible (e.g., greater than or equal to about 12 $g/m^2$ and less than or equal to about 15 $g/m^2$). Other values of basis weight are also possible. The basis weight may be determined according to the standard ISO 536.

The thickness of the fourth layer (e.g., a spacer layer) may be selected as desired. For instance, in some embodiments, the fourth layer may have a thickness of less than or equal to about 1.0 mm, less than or equal to about 0.9 mm, less than or equal to about 0.5 mm, less than or equal to about 0.4 mm, less than or equal to about 0.3 mm, or less than or equal to about 0.2 mm. In some instances, the fourth layer may have a thickness of greater than or equal to about 0.1 mm, greater than or equal to about 0.2 mm, greater than or equal to about 0.25 mm, greater than or equal to about 0.3 mm, greater than or equal to about 0.4 mm, greater than or equal to about 0.6 mm, or greater than or equal to about 0.8 mm. Combinations of the above-referenced ranges are also possible (e.g., a thickness of greater than or equal to about 0.2 mm and less than or equal to about 0.3 mm). Other values of thickness are also possible. The thickness may be determined according to the standard ISO 534.

In some embodiments, the fourth layer may have a relatively high air permeability; for example, the air permeability of the fourth layer may be higher than that of the first, second and/or third layers. For instance, in some embodiments, the fourth layer may have an air permeability of greater than or equal to about 500 $L/m^2$sec, greater than or equal to about 700 $L/m^2$sec, greater than or equal to about 1,000 $L/m^2$sec, greater than or equal to about 1,500 $L/m^2$sec, greater than or equal to about 2,000 $L/m^2$sec, greater than or equal to about 5,000 $L/m^2$sec, or greater than or equal to about 10,000 $L/m^2$sec. In some embodiments, the air permeability of the fourth layer may be less than or equal to about 12,000 $L/m^2$sec, less than or equal to about 10,000 $L/m^2$sec, less than or equal to about 8,000 $L/m^2$sec, less than or equal to about 5,000 $L/m^2$sec, less than or equal to about 2,000 $L/m^2$sec, or less than or equal to about 1,000 $L/m^2$sec. Combinations of the above-referenced ranges are also possible (e.g., greater than or equal to about 1,000 $L/m^2$sec and less than or equal to about 12,000 $L/m^2$sec). Other values of air permeability are also possible. The air permeability may be determined according to standard EN/ISO 9237 (where the measurement area is 20 $cm^2$ at a 2 mbar differential pressure).

In certain embodiments in which the fourth layer is present, the fourth layer may be formed by a spunbond process and may include a synthetic fiber, such as a fiber formed of polypropylene, polybutylene terephthalate, or polyester. The fourth layer may have a basis weight of, for example, greater than or equal to about 5 $g/m^2$ and less than or equal to about 70 $g/m^2$, and a thickness of, for example, less than or equal to about 0.5 mm.

A filter media including a plurality of layers, as described herein, may have enhanced filtration properties (e.g., dust holding capacity, lifetime, etc.). In some embodiments, the order of the layers in the filter media may influence the filtration properties of the filter media. In one example, the filter media may include a first, a second, and a third layer in numerical order (i.e., the second layer may be positioned between the first and third layers), such that the air permeability of the second layer may be lower than the air permeability of the first and third layers. The air permeability across the filter media may be described as having an hourglass configuration (i.e., the air permeability of a middle layer of the filter media may be lower than a layer upstream and a layer downstream with respect to the middle layer). In some instances, a filter media having an air permeability in this configuration may have enhanced filtration properties compared to certain existing filter media, in which the air permeability decreases across the media from an upstream side to a downstream side or from a downstream side to an upstream side. It should be appreciated that such a configuration of layers may be formed by any suitable number or arrangement of layers (e.g., four layers in non-numerical order).

In certain embodiments, an hourglass configuration may be formed with mean flow pore size (i.e., the mean flow pore size of a middle layer of the filter media may be lower than a layer upstream and a layer downstream with respect to the middle layer). For example, the second layer (e.g., efficiency layer) may have a mean flow pore size that is smaller than the mean flow pore sizes of the first and third layers (e.g., capacity and support layers, respectively). It should be appreciated that such a configuration of layers may be formed by any suitable number or arrangement of layers (e.g., four layers in non-numerical order).

In one set of embodiments, a filter media may include a first, a second, a third, and optionally a fourth layer. The second layer (and optionally the fourth layer) may be positioned between the first and third layers. When present, the fourth layer may be positioned between the second and third layers. The first layer (e.g., capacity layer) may include synthetic fibers with an average fiber diameter of greater than or equal to about 1 micron (e.g., greater than or equal to 1 micron and less than or equal to about 5 microns). In some embodiments in which the first layer includes synthetic fibers, the synthetic fibers may be formed by a meltblown process or a centrifugal spinning process, and may have a continuous length. In some cases, the first layer may include more than one sub-layer (e.g., 2-5 sub-layers). For example, the first layer may include three sub-layers and each sub-layer may include synthetic fibers formed by a meltblown process or a centrifugal spinning process. In some cases, each sub-layer in the first layer may include a relatively high weight percentage of synthetic fibers (e.g., greater than or equal to about 70 wt %, greater than or equal to about 95 wt % synthetic fibers). Each sub-layer may contain, for instance, 100 wt % of synthetic fibers. The sub-layers in the first layer may be arranged to produce a gradient in a particular property (e.g., fiber diameter) across the first layer, as described herein. The first layer may have a basis weight of, for example, greater than or equal to about 30 g/m² and less than or equal to about 150 g/m² (e.g., greater than or equal to about 60 g/m² and less than or equal to about 90 g/m²) and a thickness of, for example, greater than equal to about 0.3 mm and less than or equal to about 1.5 mm (e.g., greater than equal to about 0.5 mm and less than or equal to about 0.9 mm). In some cases, the first layer may have a mean flow pore size of, for example, greater than or equal to 50 microns and less than or equal to 100 microns (e.g., greater than or equal to 70 microns and less than or equal to 90 microns). In some cases, the first layer may have an air permeability of, for example, greater than or equal to about 150 L/m²sec and less than or equal to about 900 L/m²sec. In some instances, the first layer may have a higher mean flow pore size and/or a higher air permeability than those of the second layer.

The second layer (e.g., efficiency layer) may include synthetic fibers with an average fiber diameter of less than about or equal to about 1.5 microns (e.g., greater than or equal to about 0.2 microns and less than or equal to about 0.5 microns, or greater than or equal to about 0.2 microns and less than or equal to about 1 micron). In some embodiments in which the first layer includes synthetic fibers, the synthetic fibers may be formed by a meltblown process or a centrifugal spinning process, and may have a continuous length. In some cases, the second layer may include more than one sub-layer (e.g., 2-5 sub-layers). For example, the first layer may include two sub-layers and each sub-layer may include synthetic fibers formed by a meltblown process or a centrifugal spinning process. In some cases, each sub-layer in the second layer may include a relatively high weight percentage of synthetic fibers (e.g., greater than or equal to about 70 wt %, or greater than or equal to about 95 wt % synthetic fibers). In some embodiments, each sub-layer may contain 100 wt % of synthetic fibers. The sub-layers in the second layer may be arranged to produce a gradient in a particular property (e.g., fiber diameter) across the second layer, as described herein. The second layer may have a basis weight of, for example, greater than or equal to about 10 g/m² and less than or equal to about 30 g/m² (e.g., greater than or equal to about 15 g/m² and less than or equal to about 20 g/m²). In embodiments in which the first layer includes sub-layers, each sub-layer may have a basis weight within these ranges. In some cases, the second layer may have a mean flow pore size of greater than or equal to about 1 micron and less than or equal to about 10 microns. In some embodiments, the second layer may have an air permeability of greater than or equal to about 75 L/m²sec and less than or equal to about 125 L/m²sec. In some instances, the second layer may have a smaller mean flow pore size and/or a lower air permeability than those of the first and third layers. The second layer may optionally be joined to a fourth layer (e.g., a spun-bond layer), such that the second and fourth layers are between the first and third layers.

The third layer (e.g., support layer) may, in some embodiments, include cellulose fibers. The cellulose fibers may have an average diameter of, for example, greater than or equal to about 20 microns and less than or equal to about 50 microns (e.g., greater than or equal to about 30 microns and less than or equal to about 40 microns), and an average fiber length of, for example, greater than or equal to about 1 mm and less than or equal to about 10 mm. In some cases, the third layer may include a relatively high weight percentage of cellulose fibers (e.g., greater than or equal to about 70 wt %, or greater than or equal to about 95 wt % cellulose fibers). In one embodiment, the third layer may include 100 wt % cellulose fibers. The third layer may include perforations in some embodiments, but do not include perforations in other embodiments. When perforations are present, the perforations may cover a certain percentage of the surface area of the layer. For example, the perforations may cover greater than or equal to about 5% and less than or equal to about 20% of the surface area of the layer. The perforations may have a periodicity of, for example, greater than or equal to about 5 mm and less than or equal to about 20 mm. The average diameter of the perforations may be, for example, greater than or equal to about 0.5 mm and less than or equal to about 5 mm. In some instances, the third layer may be a single layer and may have a thickness of greater than or equal to about 0.1 mm and less than or equal to about 0.5 mm (e.g., greater than or equal to about 0.2 mm and less than or equal to about 0.4 mm). The basis weight of the third layer may be, for example, greater than or equal to about 75 g/m² and less than or equal to 150 g/m². The dry Mullen Burst strength of the third layer may be, for example, greater than or equal to about 100 kPa and less than or equal to about 500 kPa (e.g., greater than or equal to about 200 kPa and less than or equal to about 300 kPa). In some cases, the third layer may have a mean flow pore size of, for example, greater than or equal to 40 microns and less than or equal to 70 microns. The air permeability of the third layer may be, for example, greater than or equal to about 400 L/m²sec and less than or equal to about 1500 L/m²sec. In some instances, the third layer may have a higher mean flow pore size and/or a higher air permeability than those of the second layer, e.g., in some embodiments in which the second layer is positioned between the first and third layers.

The filter media may optionally include a fourth layer joined to the second layer. In certain embodiments in which the fourth layer is present, the fourth layer may be formed by a spunbond process and may include a synthetic fiber, such as a fiber formed of polypropylene, polybutylene terephthalate, or standard polyester. The fourth layer may have a basis weight of, for example, greater than or equal to about 5 g/m² and less than or equal to about 70 g/m², and a thickness of, for example, less than or equal to about 0.5 mm. Other configurations of the first, second, third, and fourth layers are also possible, as described herein.

The filter media described herein may have certain structural characteristics such as basis weight and dry Mullen Burst strength. In some embodiments, the filter media may have a basis weight of greater than or equal to about 50 g/m², greater than or equal to about 100 g/m², greater than or equal to about 150 g/m², greater than or equal to about 200 g/m², greater than or equal to about 250 g/m², greater than or equal to about 350 g/m², or greater than or equal to about 425 g/m². In some instances, the filter media may have a basis weight of less than or equal to about 500 g/m², less than or equal to about 400 g/m², less than or equal to about 300 g/m², less than or equal to about 200 g/m², or less than or equal to about 100 g/m². Combinations of the above-referenced ranges are also possible (e.g., greater than or equal to about 155 g/m² and less than or equal to about 285 g/m²). Other values of basis weight are also possible. The basis weight may be determined according to the standard ISO 536.

In some embodiments, the filter media may have a relatively high dry Mullen Burst strength. The dry Mullen Burst strength may be, for example, greater than or equal to about 100 kPa, greater than or equal to about 200 kPa, greater than or equal to about 250 kPa, greater than or equal to about 300 kPa, greater than or equal to about 350 kPa, greater than or equal to about 400 kPa, greater than or equal to about 450 kPa, or greater than or equal to about 500 kPa. In some instances, the filter media may have a dry Mullen Burst strength of less than or equal to about 600 kPa, less than or equal to about 500 kPa, less than or equal to about 400 kPa, less than or equal to about 300 kPa, or less than or equal to about 200 kPa. Combinations of the above-referenced ranges are also possible (e.g., greater than or equal to about 100 kPa and less than or equal to about 500 kPa). Other values of dry Mullen Burst strength are also possible. The dry Mullen Burst strength may be determined according to the standard DIN 53141.

In some embodiments, a filter media, as described herein, may have other advantageous properties. For example, in some embodiments, the filter media may be formed without including glass in the media. In other embodiments, the filter media may contain a small amount of glass (e.g., less than or equal to about 5 wt %, less than or equal to about 2 wt %, or less than or equal to about 1 wt %). While often having desirable filtration performance, in certain applications filter media containing glass fibers may shed during handling, release sodium, release microfibers, and/or have reduced manufacturability (e.g., pleating). It should be appreciated, however, that in other embodiments, the filter media described herein may include glass fibers in amounts higher than 5 wt %.

In some cases, the filter media described herein may have an improved lifetime. The lifetime, as referred to herein, is measured according to the standard ISO 4020. The testing can be performed using mineral oil, 4-6 cST at 23° C. as the test fluid, and carbon black and Mira 2 aluminum oxide as the organic and inorganic contaminants, respectively. The flow rate of the test fluid is 36.7 Lpm/m$^2$ and the terminal differential pressure is a 70 kPa rise over the clean filter media. The test fixture may be an IBR FS housing with a 90 mm diameter and the flat sheet media samples can be cut to fit the 90 mm FS housing. The inorganic challenge involves the use of 20 grams of Mira 2 aluminum oxide per 20 liters of mineral oil, 4-6 cST, and the organic challenge involves the use of 1.25 grams of carbon black per 20 liters of mineral oil, 4-6 cST. The lifetime is determined to be the time, in minutes, required to reach a terminal differential pressure of 70 kPa over the clean filter media with no contaminants.

In some embodiments, the filter media may have an average lifetime of greater than or equal to about 20 minutes, greater than or equal to about 40 minutes, greater than or equal to about 55 minutes, greater than or equal to about 60 minutes, greater than or equal to about 70 minutes, greater than or equal to about 85 minutes, greater than or equal to about 100 minutes, or greater than or equal to about 150 minutes. In some instances, the filter media may have an average lifetime of less than or equal to about 200 minutes, less than or equal to about 160 minutes, less than or equal to about 130 minutes, less than or equal to about 110 minutes, less than or equal to about 85 minutes, or less than or equal to about 65 minutes. Combinations of the above-referenced ranges are also possible (e.g., greater than or equal to about 40 minutes and less than or equal to about 85 minutes). Other values of average lifetime are also possible. The lifetime may be determined according to the standard ISO 4020.

In certain cases, the filter media may have a relatively high dust holding capacity. For instance, in some embodiments, the filter media may have a dust holding capacity of greater than or equal to about 50 g/m$^2$, greater than or equal to about 150 g/m$^2$, greater than or equal to about 200 g/m$^2$, greater than or equal to about 250 g/m$^2$, greater than or equal to about 300 g/m$^2$, greater than or equal to about 350 g/m$^2$, greater than or equal to about 400 g/m$^2$, or greater than or equal to about 450 g/m$^2$. In some instances, the filter media may have a dust holding capacity of less than or equal to about 500 g/m$^2$, less than or equal to about 400 g/m$^2$, less than or equal to about 300 g/m$^2$, less than or equal to about 200 g/m$^2$, or less than or equal to about 100 g/m$^2$. Combinations of the above-referenced ranges are also possible (e.g., greater than or equal to about 250 g/m$^2$ and less than or equal to about 400 g/m$^2$). The dust holding capacity may be determined according to standard ISO 19438.

In some embodiments, the filter media may be designed to have a particular range of pressure drop. For instance, in some embodiments, the filter media may have a pressure drop of greater than or equal to about 25 Pa, greater than or equal to about 60 Pa, greater than or equal to about 90 Pa, greater than or equal to about 100 Pa, greater than or equal to about 110 Pa, greater than or equal to about 150 Pa, or greater than or equal to about 180 Pa. In some instances, the filter media may have a pressure drop of less than or equal to about 200 Pa, less than or equal to about 165 Pa, less than or equal to about 140 Pa, less than or equal to about 120 Pa, less than or equal to about 105 Pa, less than or equal to about 75 Pa, or less than or equal to about 40 Pa. Combinations of the above-referenced ranges are also possible (e.g., greater than or equal to about 25 Pa and less than or equal to about 120 Pa). Other values of pressure drop are also possible. The pressure drop, as described herein, can be determined at 10.5 FPM face velocity using a TSI 8130 filtration tester.

In some embodiments, the filter media may have a certain air permeability. For instance, in some embodiments, the filter media may have an air permeability of less than or equal to about 1000 L/m$^2$sec, less than or equal to about 800 L/m$^2$sec, less than or equal to about 600 L/m$^2$sec, less than or equal to about 400 L/m$^2$sec, less than or equal to about 100 L/m$^2$sec, or less than or equal to about 50 L/m$^2$sec. In some instances, the filter media may have an air permeability of greater than or equal to about 30 L/m$^2$sec, greater than or equal to about 150 L/m$^2$sec, greater than or equal to about 250 L/m$^2$sec, greater than or equal to about 500 L/m$^2$sec, greater than or equal to about 750 L/m$^2$sec, or greater than or equal to about 900 L/m$^2$sec. Combinations of the above-referenced ranges are also possible (e.g., greater than or equal to about 75 L/m$^2$sec and less than or equal to about 150 L/m$^2$sec). Other values of air permeability are also possible. The air permeability may be determined according to standard EN/ISO 9327 (A=20 cm$^2$ at a 2 mbar differential pressure).

The filter media described herein may be used for the filtration of various particle sizes. In a typical test for measuring efficiency of a layer or the entire media (e.g., according to the standard ISO 19438), particle counts (particles per milliliter) at the particle size, x, selected (e.g., where x is 1, 3, 4, 5, 7, 10, 15, 20, 25, or 30 microns) upstream and downstream of the layer or media can be taken at ten points equally divided over the time of the test. Generally, a particle size of x means that x micron or greater particles will be captured by the layer or media. The average of upstream and downstream particle counts can be taken at the selected particle size. From the average particle count upstream (injected $-C_0$) and the average particle count downstream (passed thru $-C$) the filtration efficiency test value for the particle size selected can be determined by the relationship $[(100-[C/C_0])*100\%]$. As described herein, efficiency can be measured according to standard ISO 19328. A similar protocol can be used for measuring initial efficiency, which refers to the average efficiency measurements of the media at 4, 5, and 6 minutes after running the test. Unless otherwise indicated, efficiency and initial efficiency measurements described herein refer to values where x=4 microns.

Efficiency can also be expressed in terms of a Beta value (or Beta ratio), where $Beta_{(x)}=y$ is the ratio of upstream count ($C_0$) to downstream count (C), and where x is the minimum particle size that will achieve the actual ratio of $C_0$ to C that is equal to y. The penetration fraction of the media is 1 divided by the $Beta_{(x)}$ value (y), and the efficiency fraction is 1−penetration fraction. Accordingly, the efficiency of the media is 100 times the efficiency fraction, and $100*(1-1/Beta_{(x)})$=efficiency percentage. For example, a filter media having a $Beta_{(x)}=200$ has an efficiency of $[1-(1/200)]*100$, or 99.5% for x micron or greater particles. The filter media described herein may have a wide range of Beta values, e.g., a $Beta_{(x)}=y$, where x can be, for example, 1, 3, 4, 5, 7, 10, 12, 15, 20, 25, 30, 50, 70, or 100, and where y can be, for example, 2, 10, 75, 100, 200, or 1000. It should be understood that other values of x and y are also possible; for instance, in some cases, y may be greater than 1000. It should also be understood that for any value of x, y may be any number (e.g., 10.2, 12.4) representing the actual ratio of $C_0$ to C. Likewise, for any value of y, x may be any number representing the minimum particle size that will achieve the actual ratio of $C_0$ to C that is equal to y. Unless otherwise indicated, beta measurements described herein refer to values where x=4 microns.

In some embodiments, the filter media may have a relatively high efficiency. For instance, in some embodiments, the efficiency of the filter media may be greater than or equal to about 80%, greater than or equal to about 90%, greater than or equal to about 95%, greater than or equal to about 96%, greater than or equal to about 97%, greater than or equal to about 98%, greater than or equal to about 99%, or greater than or equal to about 99.9%. In some instances, the efficiency of the filter media may be less than or equal to about 99.99%, less than or equal to about 98%, less than or equal to about 97%, less than or equal to about 96%, or less than or equal to about 90%. Combinations of the above-referenced ranges are also possible (e.g., greater than or equal to about 80% and less than or equal to about 99.99%). Other values of the efficiency of the filter media are also possible. The efficiency may be determined according to standard ISO 19438. As described herein, efficiency can be measured at different particle sizes (e.g., for x micron or greater particles, where x is described herein), and the above ranges of efficiency may be suitable for the various particle sizes described herein. In some embodiments, x is 4 microns such that the above ranges of efficiency are suitable for filtering out 4 micron or larger particles.

The filter media may also have a relatively high initial efficiency. The initial efficiency of the filter media may be greater than or equal to about 80%, greater than or equal to about 90%, greater than or equal to about 95%, greater than or equal to about 96%, greater than or equal to about 97%, greater than or equal to about 98%, greater than or equal to about 99%, or greater than or equal to about 99.9%. In some instances, the initial efficiency of the filter media may be less than or equal to about 99.99%, less than or equal to about 98%, less than or equal to about 97%, less than or equal to about 96%, or less than or equal to about 90%. Combinations of the above-referenced ranges are also possible (e.g., greater than or equal to about 80% and less than or equal to about 99.99%). Other values of the initial efficiency of the filter media are also possible. The initial efficiency may be determined according to standard ISO 19438. As described herein, initial efficiency can be measured at different particle sizes (e.g., for x micron or greater particles, where x is described herein), and the above ranges of initial efficiency may be suitable for the various particle sizes described herein. In some embodiments, x is 4 microns such that the above ranges of initial efficiency are suitable for filtering out 4 micron or larger particles.

In some embodiments, one or more layers of a filter media described herein include a resin. Typically, a resin or any additional components, if present, are present in limited amounts. In some embodiments, one or more layers may include wet and/or dry strength resins that include, for example, natural polymers (starches, gums), cellulose derivatives, such as carboxymethyl cellulose, methylcellulose, hemicelluloses, synthetic polymers such as phenolics, latexes, polyamides, polyacrylamides, urea-formaldehyde, melamine-formaldehyde, polyamides), surfactants, coupling agents, crosslinking agents, and/or conductive additives, amongst others.

In some embodiments, a layer may include a binder resin. The binder resin is not in fiber form and is to be distinguished from binder fiber (e.g., multi-component fiber) described above. In general, the binder resin may have any suitable composition. For example, the binder resin may comprise a thermoplastic (e.g., acrylic, polyvinylacetate, polyester, polyamide), a thermoset (e.g., epoxy, phenolic resin), or a combination thereof. In some cases, a binder resin includes one or more of a vinyl acetate resin, an epoxy resin, a polyester resin, a copolyester resin, a polyvinyl alcohol resin, an acrylic resin such as a styrene acrylic resin, and a phenolic resin. Other resins are also possible.

The amount of binder resin in a layer (e.g., a first, second, third, and/or fourth layer) may vary. For instance, in some embodiments, the weight percentage of binder resin in the layer may be greater than or equal to about 2 wt %, greater than or equal to about 5 wt %, greater than or equal to about 10 wt %, greater than or equal to about 15 wt %, greater than or equal to about 20 wt %, greater than or equal to about 25 wt %, greater than or equal to about 30 wt %, greater than or equal to about 35 wt %, or greater than or equal to about 40 wt %. In some cases, the weight percentage of binder resin in the layer may be less than or equal to about 45 wt %, less than or equal to about 40 wt %, less than or equal to about 35 wt %, less than or equal to about 30 wt %, less than or equal to about 25 wt %, less than or equal to about 20 wt %, less than or equal to about 15 wt %, less than or equal to about 10 wt %, or less than or equal to about 5 wt %. Combinations of the above-referenced ranges are also possible (e.g., a weight percentage of binder resin of greater than or equal to about 5 wt % and less than or equal to about 35 wt %). Other ranges are also possible.

The amount of binder resin in the filter media may also vary. For instance, in some embodiments, the weight percentage of binder resin in the filter media may be greater than or equal to about 2 wt %, greater than or equal to about 5 wt %, greater than or equal to about 10 wt %, greater than or equal to about 15 wt %, greater than or equal to about 20 wt %, greater than or equal to about 25 wt %, greater than or equal to about 30 wt %, or greater than or equal to about 35 wt %. In some cases, the weight percentage of binder resin in the layer may be less than or equal to about 40 wt %, less than or equal to about 35 wt %, less than or equal to about 30 wt %, less than or equal to about 25 wt %, less than or equal to about 20 wt %, less than or equal to about 15 wt %, less than or equal to about 10 wt %, or less than or equal to about 5 wt %. Combinations of the above-referenced ranges are also possible (e.g., a weight percentage of binder resin of greater than or equal to about 5 wt % and less than or equal to about 35 wt %). Other ranges are also possible.

As described further below, the binder resin may be added to the fibers in any suitable manner including, for example, in the wet state. In some embodiments, the binder coats the fibers and is used to adhere fibers to each other to facilitate adhesion between the fibers. Any suitable method and equipment may be used to coat the fibers, for example, using curtain coating, gravure coating, melt coating, dip coating, knife roll coating, or spin coating, amongst others. In some embodiments, the binder is precipitated when added to the fiber blend. When appropriate, any suitable precipitating agent (e.g., Epichlorohydrin, fluorocarbon) may be provided to the fibers, for example, by injection into the blend. In some embodiments, upon addition to the fiber blend, the binder resin is added in a manner such that the layer is impregnated with the binder resin (e.g., the binder resin permeates throughout the layer). In a multi-layered web, a binder resin may be added to each of the layers separately prior to combining the layers, or the binder resin may be added to the layer after combining the layers. In some embodiments, binder resin is added to the fiber blend while in a dry state, for example, by spraying or saturation impregnation, or any of the above methods. In other embodiments, a binder resin is added to a wet layer.

In some embodiments, a binder resin may be added to a layer by a solvent saturation process. In certain embodiments, a polymeric material can be impregnated into filter medium either during or after the filter medium is being manufactured on a papermaking machine. For example, during a manufacturing process described herein, after the article containing first layer and second layer is formed and dried, a polymeric material in a water based emulsion or an organic solvent based solution can be adhered to an application roll and then applied to the article under a controlled pressure by using a size press or gravure saturator. The amount of the polymeric material impregnated into the filter medium typically depends on the viscosity, solids content, and absorption rate of filter medium. As another example, after a layer is formed, it can be impregnated with a polymeric material by using a reverse roll applicator following the just-mentioned method and/or by using a dip and squeeze method (e.g., by dipping a dried filter media into a polymer emulsion or solution and then squeezing out the excess polymer by using a nip). A polymeric material can also be applied to a layer by other methods known in the art, such as spraying or foaming.

Layers or sub-layers for incorporation into a filter media, as described herein, may be produced using any suitable processes, such as using a wet laid process (e.g., a process involving a pressure former, a rotoformer, a fourdrinier, a hybrid former, or a twin wire process) or a non-wet laid process (e.g., a dry laid process, an air laid process, a spunbond process, a meltblown process, an electrospinning process, a centrifugal spinning process, or a carding process). In general, a wet laid process involves mixing together of fibers of one or more type to provide a fiber slurry. The slurry may be, for example, an aqueous-based slurry. In certain embodiments, the various fibers are optionally stored separately, or in combination, in various holding tanks prior to being mixed together (e.g., to achieve a greater degree of uniformity in the mixture).

For instance, a first fiber may be mixed and pulped together in one container and a second fiber may be mixed and pulped in a separate container. The first fibers and the second fibers may subsequently be combined together into a single fibrous mixture. Appropriate fibers may be processed through a pulper before and/or after being mixed together. In some embodiments, combinations of fibers are processed through a pulper and/or a holding tank prior to being mixed together. It can be appreciated that other components may also be introduced into the mixture.

In certain embodiments, one or more layers described herein (e.g., a first, a second, a third, and/or a fourth layer) may include a multi-layered structure that may be formed by a wet laid process. For example, a first dispersion (e.g., a pulp) containing fibers in a solvent (e.g., an aqueous solvent such as water) can be applied onto a wire conveyor in a papermaking machine (e.g., a fourdrinier or a rotoformer) to form first layer supported by the wire conveyor. A second dispersion (e.g., another pulp) containing fibers in a solvent (e.g., an aqueous solvent such as water) may be applied onto the first layer either at the same time or subsequent to deposition of the first layer on the wire. Vacuum is continuously applied to the first and second dispersions of fibers during the above process to remove the solvent from the fibers, thereby resulting in an article containing first and second layers. The article thus formed may then be dried and, if necessary, further processed (e.g., calendered) by using known methods to form multi-layered layers. In some embodiments, such a process may result in a gradient in at least one property across the thickness of the two or more layers, as described herein.

Any suitable method for creating a fiber slurry may be used. In some embodiments, further additives are added to the slurry to facilitate processing. The temperature may also be adjusted to a suitable range, for example, between 33° F. and 100° F. (e.g., between 50° F. and 85° F.). In some cases, the temperature of the slurry is maintained. In some instances, the temperature is not actively adjusted.

In some embodiments, the wet laid process uses similar equipment as in a conventional papermaking process, for example, a hydropulper, a former or a headbox, a dryer, and an optional converter. A layer can also be made with a laboratory handsheet mold in some instances. As discussed above, the slurry may be prepared in one or more pulpers. After appropriately mixing the slurry in a pulper, the slurry may be pumped into a headbox where the slurry may or may not be combined with other slurries. Other additives may or may not be added. The slurry may also be diluted with additional water such that the final concentration of fiber is in a suitable range, such as for example, between about 0.1% to 0.5% by weight.

Wet laid processes may be particularly suitable for forming a multi-layered structure within a layer (e.g., a first, a second, a third, and/or a fourth layer), or for combining two or more such layers, as described herein. For instance, in some cases, the same slurry is pumped into separate headboxes to form different layers within a layer. For laboratory samples, a first layer can be formed from a fiber slurry, drained and dried and then a second layer can be formed on top from a fiber slurry. In other embodiments, one layer can be formed and another layer can be formed on top, drained, and dried.

In some cases, the pH of the fiber slurry may be adjusted as desired. For instance, fibers of the slurry may be dispersed under generally neutral conditions.

Before the slurry is sent to a headbox, the slurry may optionally be passed through centrifugal cleaners and/or pressure screens for removing unfiberized material. The slurry may or may not be passed through additional equipment such as refiners or deflakers to further enhance the dispersion or fibrillation of the fibers. For example, deflakers may be useful to smooth out or remove lumps or protrusions that may arise at any point during formation of the fiber slurry. Fibers may then be collected on to a screen or wire at an appropriate rate using any suitable equipment, e.g., a fourdrinier, a rotoformer, a cylinder, or an inclined wire fourdrinier.

In some embodiments, the process involves introducing a binder (and/or other components) into a pre-formed fiber layer. In some embodiments, as the fiber layer is passed along an appropriate screen or wire, different components included in the binder, which may be in the form of separate emulsions, are added to the fiber layer using a suitable technique. In some cases, each component of the binder resin is mixed as an emulsion prior to being combined with the other components and/or fiber layer. In some embodiments, the components included in the binder may be pulled through the fiber layer using, for example, gravity and/or vacuum. In some embodiments, one or more of the components included in the binder resin may be diluted with softened water and pumped into the fiber layer. In some embodiments, a binder may be introduced to the fiber layer by spraying onto the formed media, or by any other suitable method, such as for example, size press application, foam saturation, curtain coating, rod coating, amongst others. In some embodiments, a binder material may be applied to a fiber slurry prior to introducing the slurry into a headbox. For example, the binder material may be introduced (e.g., injected) into the fiber slurry and impregnated with and/or precipitated on to the fibers. In some embodiments, a binder resin may be added to a layer by a solvent saturation process.

In other embodiments, a non-wet laid process is used to form one or more layers of a media. For example, in a non-wet laid process, an air laid process or a carding process may be used. For example, in an air laid process, fibers may be mixed while air is blown onto a conveyor, and a binder is then applied. In a carding process, in some embodiments, the fibers are manipulated by rollers and extensions (e.g., hooks, needles) associated with the rollers prior to application of the binder. In some cases, forming the layers through a non-wet laid process may be more suitable for the production of a highly porous media. The non-wet layer may be impregnated (e.g., via saturation, spraying, etc.) with any suitable binder resin, as discussed above.

During or after formation of a layer, the layer may be further processed according to a variety of known techniques. Optionally, additional layers can be formed and/or added to a layer using processes such as lamination, thermo-dot bonding, ultrasonic, calendering, glue-web, co-pleating, or collation. For example, in some cases, two layers are formed into a composite article by a wet laid process as described above, and the composite article is then combined with another layer by any suitable process (e.g., lamination, co-pleating, or collation). In another example, more than one layer (e.g., meltblown layers) may be joined together by thermo-dot bonding, calendering, a glue web, or ultrasonic processes to form a layer (e.g., the second layer). It can be appreciated that a layer formed by the processes described herein may be suitably tailored not only based on the components of each layer, but also according to the effect of using multiple layers of varying properties in appropriate combination to form a layer or filter media having the characteristics described herein.

In some embodiments, further processing may involve pleating the layer and/or the filter media. For instance, two layers may be joined by a co-pleating process. In some cases, the filter media, or various layers thereof, may be suitably pleated by forming score lines at appropriately spaced distances apart from one another, allowing the filter media to be folded. It should be appreciated that any suitable pleating technique may be used.

In some embodiments, a filter media can be post-processed such as subjected to a corrugation process to increase surface area within the web. In other embodiments, a filter media may be embossed.

As described herein, in some embodiments, two or more layers (e.g., the first, second, third, and/or fourth layers) in the filter media may be formed separately, and joined by any suitable method such as lamination, collation, thermo-dot bonding, ultrasonic processes (e.g., ultrasonically point bonded together), calendering, glue-web, or by use of adhesives. For instance, the third layer (e.g., a support layer) may be joined to the second layer (e.g. an efficiency layer) using thermo-dot bonding and an adhesive (e.g., spray or spinner). In some cases, the layers may be ultrasonically bonded together (e.g., ultrasonically point bonded together). In other cases, the layers may be calendered together. Calendering may involve, for example, compressing two or more layers together using calender rolls under a particular linear pressure, temperature, and line speed.

Two or more layers and/or sub-layers may be formed using different processes, or the same process. For example, each of the layers may be independently formed by a wet laid process, a non-wet laid process, a spinning process, a meltblown process, electrospun or any other suitable process. In some embodiments, two or more layers may be formed by the same process (e.g., a wet laid process, a non-wet laid process, such as a spinning process, a meltblown process, or any other suitable process). In some instances, the two or more layers may be formed simultaneously.

In some embodiments, as described herein, a layer may include fibers formed from a meltblown process. In embodiments in which the filter media includes a meltblown layer, the meltblown layer may have one or more characteristics described in commonly-owned U.S. Patent Publication No. 2009/0120048, entitled "Meltblown Filter Medium", which is based on U.S. patent application Ser. No. 12/266,892, filed on May 14, 2009, and commonly-owned U.S. application Ser. No. 12/971,539, entitled "Fine Fiber Filter Media and Processes", filed on Dec. 17, 2010, each of which is incorporated herein by reference in its entirety for all purposes. In other embodiments, a layer may be formed via other suitable processes such as meltspun, melt electrospinning and/or liquid electrospinning processes.

As described herein, a layer in the filter media may include a plurality of perforations. In general the plurality of perforations may be formed by any suitable process. For instance, for a dry web, a plurality of perforations may be formed by a thermo-mechanical process (e.g., thermo-dot bonder) or a mechanical process (e.g., puncture or hydro-entangling). For a wet web, for example, a plurality of perforations may be formed by using a perforated Dandy-roll or by hydro-entangling. In a thermo-dot bonder, a thermo-mechanical element applies heat and force to a layer to create perforations. Puncture and Dandy roll processes involve the application of mechanical force on a wet layer during drying to make the perforations. Hydro-entangling makes perforations in a layer through the application of hydro-mechanical force on a wet or dry layer. In some cases, the application of thermal energy (e.g., a laser) can be used to form perforations.

The filter media described herein can be incorporated into a variety of filter elements for use in various applications including hydraulic and non-hydraulic filtration applications. Exemplary uses of hydraulic filters (e.g., high-, medium-, and low-pressure specialty filters) include mobile and industrial filters. Exemplary uses of non-hydraulic filters include fuel filters (e.g., ultra-low sulfur diesel), oil filters (e.g., lube oil filters or heavy duty lube oil filters), chemical processing filters, industrial processing filters, medical filters (e.g., filters for blood), air filters (e.g., heavy duty air filters, automotive air filters, HVAC filters, HEPA filters), and water filters. In some embodiments, a number of layers of filter media may be wrapped around an inner substrate (e.g., a synthetic or metal core) to form a wrapped filter. For example, a wrapped filter may include between 5 and 10 layers of filter media wrapped around the inner substrate. In some cases, filter media described herein can be used as filter media for coalescing applications (e.g., using a wrapped filter). For example, such filter media may be used to remove oil from compressed air, or to remove water from fuel. In some embodiments, the third layer substantially supports the filter element, such that an additional support layer, such as a plastic or metallic net, wire, or mesh, is absent from the filter media or filter element.

The filter elements may have the same property values as those noted above in connection with the filter media. For example, the above-noted basis weights, dust holding capacities, efficiencies of the filter media may also be found in filter elements.

During use, the filter media mechanically trap particles on or in the layers as fluid flows through the filter media. The filter media need not be electrically charged to enhance trapping of contamination. Thus, in some embodiments, the filter media are not electrically charged. However, in some embodiments, the filter media may be electrically charged.

EXAMPLES

Example 1

A filter media having four layers and the general configuration shown in FIG. 3 was fabricated.

The first layer (e.g., a capacity layer) included a multi-layer gradient structure that was used to enhance the dust holding capacity of the filter media. The first layer included three sub-layers, each sub-layer having a basis weight of about 30 gsm. The air permeabilities of the three sub-layers were about 300 L/m²sec, about 400 L/m²sec, and about 400 L/m²sec, respectively. The first layer was formed from polyester fibers having fiber diameters from about 1 to about 4 microns. The first layer was formed by a meltblown process.

Adjacent the first layer was a second layer (e.g., an efficiency layer) used to enhance the particle capture efficiency of the filter media. The second layer was a meltblown layer having a basis weight of about 20 g/m². The second layer was formed of polybutylene terephthalate fibers having an average fiber diameter of between about 0.2 microns and about 0.5 microns. The air permeability of the second layer was about 110 L/m²sec. The mean flow pore size was about 4 microns.

Adjacent the second layer was a fourth layer (e.g., a spacer layer) that acted as a spacer between the second and third layers. The fourth layer was a spunbond layer having a basis weight of about 15 gsm. The fourth layer was formed of polybutylene terephthalate fibers having an average diameter of about 10 to about 15 microns.

Adjacent the fourth layer on the opposite side of the second layer was a third layer (e.g., a support layer). The third layer was included to provide structural support to the filter media. The third layer was formed of cellulose fibers (a combination of a mercerized softwood fibers and non-mercerized softwood fibers) and was impregnated with a phenolic resin. The third layer did not include perforations. The third layer had a thickness of about 0.3 mm, a mean flow pore size of about 60 microns, and had an air permeability of about 400 L/m²sec. The third layer had a dry Mullen burst strength of about 50 kPa (prior to being impregnated with the phenolic resin).

The first, second, and fourth layers were point bonded together. These layers were then bonded to the third layer using a hot-melt adhesive.

The filter media had an initial efficiency (4 micron particles) of about 99.0%, a beta ratio of about 100, and a dust holding capacity of about 225 g/m² as measured according to the standard ISO 19438. The ISO 4020 lifetime of the filter media was quite desirable. Notably, the efficiency of the filter media increased by about 2.3 times compared to Comparative Example 1, described below. Additionally, the dust holding capacity improved by greater than 25% and the filter lifetime improved by greater than 375%, compared to Comparative Example 1. The filter media in this example did not include any glass fibers.

Comparative Example 1

A filter media was fabricated by spray bonding a single meltblown layer including synthetic fibers onto a wet laid composite layer including a mixture of cellulose and microglass fibers. The filter media had a basis weight of about 300 g/m² and a thickness of about 1 mm.

The filter media had an air permeability of about 2 CFM/ft², an initial efficiency (of 4 micron particles) of about 97.7%, and a dust holding capacity of about 175 g/m² as measured according to the standard ISO 19438.

Example 2

A filter media similar to the one described in Example 1 was fabricated, except the second, efficiency layer included two second layers (i.e., two sub-layers, each sub-layer having the construction of the second layer described in Example 1), which were used to enhance the particle capture efficiency of the filter media. The two sub-layers of the efficiency layer included polybutylene terephthalate fibers formed by a meltblown process and the sub-layers were combined by point bonding. The second layer had a mean pore flow size of about 3.4 microns. The filter media had an initial efficiency (of 4 micron particles) of about 99.75%, a beta ratio of about 400, and a dust holding capacity of about 275 g/m² as measured according to the standard ISO 19438.

Example 3

A filter media similar to that described in Example 1 was fabricated except for the composition of the third layer, and the presence of perforations in the third layer of this example. The third layer was formed of cellulose fibers (a combination of a hardwood fibers and softwood fibers) known for imparting high structural strength to the final paper or nonwoven media. The layer was impregnated with a phenolic resin. The perforations in the third layer had a length of about 1.5 mm and a width of about 1.0 mm. The third layer had about 5% perforation coverage. The air permeability of the third layer was about 900 L/m²sec. Prior to being perforated, the third layer had a mean flow pore size of about 10 microns.

The filter media provided about a 230% increase in air-permeability (e.g., a lower resistance) compared to the filter media of Example 1 due to the presence of the perforations in the third layer. There was no substantially change (within variance) for dust holding capacity for the filter media in this example compared to the filter media of Example 1. Additionally, the filter media in this example had an increase in lifetime of greater than 50% at the same dust holding capacity performance compared to the media of Example 1. The increase in lifetime was most likely due to the lowered resistance of the media (as a result of the presence of perforations in the third layer) compared to the media of Example 1.

Furthermore, because specific fibers known for imparting high structural strength to the final paper or nonwoven media were used in the third layer, the dry Mullen Burst strength of the third layer was about 340 kPa (prior to being impregnated with the phenolic resin), significantly higher than that of the third layer of Example 1, which had a dry Mullen Burst strength of about 50 kPa. The specific fibers which yield high strength properties also formed a relatively tight pore structure in this layer (e.g., a mean flow pore size of about 10 microns compared to about 60 microns in the third layer of Example 1). However, the presence of the perforations in the third layer in this example alleviated the high resistance across the layer, resulting in a high air permeability (e.g., about 900 L/m²sec compared to about 400 L/m²sec for the third layer of Example 1).

Example 4

A filter media similar to that described in Example 3 was fabricated except the third layer had about a 10% perforation coverage. The air permeability of the third layer was about 1100 L/m²sec. There was no substantial change (within variance) for dust holding capacity for the filter media in this example compared to the filter media of Example 1.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A filter media, comprising:
   a first layer comprising a first plurality of fibers, wherein the first layer has a first air permeability and a first mean flow pore size;
   a second layer comprising a second plurality of fibers having an average fiber diameter of less than or equal to about 1 micron, wherein the second layer has a second air permeability and a second mean flow pore size, and wherein the second plurality of fibers are formed by a melt-blown process; and
   a third layer comprising a third plurality of fibers, wherein the third plurality of fibers comprises cellulose fibers, wherein the third layer has a third air permeability and a third mean flow pore size, and wherein the third layer has a density of greater than or equal to about 0.75 kg/m³ and less than or equal to about 1.25 kg/m³,
   wherein each of the first and third air permeabilities is higher than the second air permeability and/or wherein each of the first and third mean flow pore sizes is higher than the second mean flow pore size,
   wherein the first layer, the second layer, and the third layer are discrete layers, and
   wherein the second layer is positioned between the first and third layers.

2. The filter media of claim 1, wherein the first mean flow pore size is higher than the second mean flow pore size.

3. The filter media of claim 1, wherein the second mean flow pore size is greater than or equal to about 1 micron and less than or equal to about 10 microns.

4. The filter media of claim 1, wherein the first plurality of fibers comprises synthetic fibers.

5. The filter media of claim 1, wherein the first layer has an air permeability of greater than or equal to about 150 L/m² sec and less than or equal to about 900 L/m² sec.

6. The filter media of claim 1, wherein the first layer comprises a multi-layered structure.

7. The filter media of claim 1, wherein the filter media includes less than or equal to about 2 wt % glass fibers.

8. The filter media of claim 1, wherein the average fiber diameter of the second plurality of fibers is greater than or equal to about 0.2 and less than or equal to about 0.8 microns.

9. The filter media of claim 1, wherein the second layer comprises a multi-layered structure.

10. The filter media of claim 1, wherein the second layer has an efficiency of greater than or equal to about 99% and less than or equal to about 99.99% for 4 micron or larger particles, as measured by a Multipass Filter Test following the ISO 19438 procedure at a BUGL of 50 mg/L, a face velocity of 0.06 cm/s, and a terminal pressure of 100 kPa.

11. The filter media of claim 1, wherein the filter media has an air permeability of greater than or equal to about 50 L/m² sec and less than or equal to about 500 L/m² sec.

12. The filter media of claim 1, wherein the third plurality of fibers has an average fiber diameter of greater than or equal to about 20 microns and less than or equal to about 50 microns.

13. The filter media of claim 1, wherein the third layer has an average weight percentage of cellulose fibers of greater than or equal to about 40 percent and less than or equal to about 100 percent.

14. The filter media of claim 1, wherein the third layer comprises a plurality of perforations.

15. The filter media of claim 14, wherein the perforations cover greater than or equal to about 5% and less than or equal to about 20% of the surface area of the third layer.

16. The filter media of claim 1, wherein the third layer has a Mullen Burst strength of greater than or equal to about 200 kPa and less than or equal to about 300 kPa.

17. The filter media of claim 1, wherein the third layer has an air permeability of greater than or equal to about 400 L/m² sec and less than or equal to about 700 L/m2 sec.

18. The filter media of claim 1, wherein the first air permeability is higher than the second air permeability.

19. The filter media of claim 1, wherein the third air permeability is at least 20 times greater than the second air permeability and/or the first air permeability.

20. The filter media of claim 1 comprising a fourth layer, wherein the fourth layer is a spun-bond layer.

21. The filter media of claim 1, wherein the third layer has a pressure drop of less than or equal to about 30 Pa.

22. The filter media of claim 14, wherein the plurality of perforations have an average diameter of greater than or equal to about 0.5 mm and less than or equal to about 5 mm.

23. The filter media of claim 1, wherein the filter media is pleated.

24. A filter element comprising the filter media of claim 1, wherein the third layer is upstream of the first layer.

25. A filter element comprising the filter media of claim 1, wherein the third layer is downstream of the first layer.

26. The filter media of claim 14, wherein the average periodicity of the plurality of perforation is greater than or equal to about 5 mm and less than or equal to about 20 mm.

27. The filter media of claim 14, wherein the plurality of perforations have an average protrusion length of greater than or equal to about 1 mm and less than or equal to about 5 mm.

28. The filter media of claim 1, wherein the filter media has an average lifetime of greater than or equal to about 40 minutes and less than or equal to about 85 minutes as measured according to the standard ISO 4020.

29. The filter media of claim 20, wherein the fourth layer has an average thickness of less than or equal to about 0.3 mm.

30. The filter media of claim 1, wherein the first layer comprises at least three sub-layers.

31. The filter media of claim 1, wherein the first plurality of fibers comprises meltblown synthetic fibers.

32. The filter media of claim 1, wherein the first plurality of fibers has an average diameter of greater than or equal to 1 micron.

33. A filter element including the filter media of claim 1, wherein the filter element lacks a plastic or metallic net, wire, or mesh support structure.

34. A filter media, comprising:
a first layer comprising a first plurality of fibers, wherein the first layer has a first air permeability and a first mean flow pore size;
a second layer comprising a second plurality of fibers having an average fiber diameter of less than or equal to about 1 micron, wherein the second layer has a second air permeability and a second mean flow pore size; and
a third layer comprising a third plurality of fibers, wherein the third plurality of fibers comprises cellulose fibers, wherein the third layer has a third air permeability and a third mean flow pore size, and wherein the third layer comprises a plurality of perforations,
wherein each of the first and third air permeabilities is higher than the second air permeability and/or wherein each of the first and third mean flow pore sizes is higher than the second mean flow pore size,
wherein the first layer, the second layer, and the third layer are discrete layers, and
wherein the second layer is positioned between the first and third layers.

35. The filter media of claim 34, wherein the first mean flow pore size is higher than the second mean flow pore size.

36. The filter media of claim 34, wherein the second mean flow pore size is greater than or equal to about 1 micron and less than or equal to about 10 microns.

37. The filter media of claim 34, wherein the first and/or second plurality of fibers comprises synthetic fibers.

38. The filter media of claim 34, wherein the first layer has an air permeability of greater than or equal to about 150 L/m² sec and less than or equal to about 900 L/m² sec.

39. The filter media of claim 34, wherein the first layer comprises a multi-layered structure.

40. The filter media of claim 34, wherein the filter media includes less than or equal to about 2 wt % glass fibers.

41. The filter media of claim 34, wherein the average fiber diameter of the second plurality of fibers is greater than or equal to about 0.2 and less than or equal to about 0.8 microns.

42. The filter media of claim 34, wherein the second layer comprises a multi-layered structure.

43. The filter media of claim 34, wherein the second layer has an efficiency of greater than or equal to about 99% and less than or equal to about 99.99% for 4 micron or larger particles, as measured by a Multipass Filter Test following the ISO 19438 procedure at a BUGL of 50 mg/L, a face velocity of 0.06 cm/s, and a terminal pressure of 100 kPa.

44. The filter media of claim 34, wherein the filter media has an air permeability of greater than or equal to about 50 L/m² sec and less than or equal to about 500 L/m² sec.

45. The filter media of claim 34, wherein the third plurality of fibers has an average fiber diameter of greater than or equal to about 20 microns and less than or equal to about 50 microns.

46. The filter media of claim 34, wherein the third layer has an average weight percentage of cellulose fibers of greater than or equal to about 40 percent and less than or equal to about 100 percent.

47. The filter media of claim 34, wherein the third layer has a Mullen Burst strength of greater than or equal to about 200 kPa and less than or equal to about 300 kPa.

48. The filter media of claim 34, wherein the third layer has an air permeability of greater than or equal to about 400 L/m² sec and less than or equal to about 700 L/m² sec.

49. The filter media of claim 34, wherein the first air permeability is higher than the second air permeability.

50. The filter media of claim 34, wherein the third air permeability is at least 20 times greater than the second air permeability and/or the first air permeability.

51. The filter media of claim 34 comprising a fourth layer, wherein the fourth layer is a spun-bond layer.

52. The filter media of claim 34, wherein the third layer has a density of greater than or equal to about 0.75 kg/m³ and less than or equal to about 1.25 kg/m³.

53. The filter media of claim 34, wherein the third layer has a pressure drop of less than or equal to about 30 Pa.

54. The filter media of claim 34, wherein the filter media is pleated.

55. A filter element comprising the filter media of claim 34, wherein the third layer is upstream of the first layer.

56. A filter element comprising the filter media of claim 34, wherein the third layer is downstream of the first layer.

57. The filter media of claim 34, wherein the average periodicity of the plurality of perforation is greater than or equal to about 5 mm and less than or equal to about 20 mm.

58. The filter media of claim 34, wherein the filter media has an average lifetime of greater than or equal to about 40 minutes and less than or equal to about 85 minutes as measured according to the standard ISO 4020.

59. The filter media of claim 51, wherein the fourth layer has an average thickness of less than or equal to about 0.3 mm.

60. The filter media of claim 34, wherein the first layer comprises at least three sub-layers.

61. The filter media of claim 34, wherein the first plurality of fibers comprises meltblown synthetic fibers.

62. The filter media of claim 34, wherein the first plurality of fibers has an average diameter of greater than or equal to 1 micron.

63. A filter element including the filter media of claim 34, wherein the filter element lacks a plastic or metallic net, wire, or mesh support structure.

64. A filter media, comprising:
a first layer comprising a first plurality of fibers, wherein the first layer has a first air permeability and a first mean flow pore size;
a second layer comprising a second plurality of fibers having an average fiber diameter of less than or equal to about 1 micron, wherein the second layer has a second air permeability and a second mean flow pore size; and
a third layer comprising a third plurality of fibers, wherein the third plurality of fibers comprises cellulose fibers, wherein the third layer has a third air permeability and a third mean flow pore size, and wherein the third layer has a density of greater than or equal to about 0.75 kg/m³ and less than or equal to about 1.25 kg/m³,
wherein each of the first and third air permeabilities is higher than the second air permeability and/or wherein each of the first and third mean flow pore sizes is higher than the second mean flow pore size,
wherein the first layer, the second layer, and the third layer are discrete layers, and
wherein the second layer is positioned between the first and third layers.

65. The filter media of claim 64, wherein the first mean flow pore size is higher than the second mean flow pore size.

66. The filter media of claim 64, wherein the second mean flow pore size is greater than or equal to about 1 micron and less than or equal to about 10 microns.

67. The filter media of claim 64, wherein the first and/or second plurality of fibers comprises synthetic fibers.

68. The filter media of claim 64, wherein the first layer has an air permeability of greater than or equal to about 150 L/m² sec and less than or equal to about 900 L/m² sec.

69. The filter media of claim 64, wherein the first layer comprises a multi-layered structure.

70. The filter media of claim 64, wherein the filter media includes less than or equal to about 2 wt % glass fibers.

71. The filter media of claim 64, wherein the average fiber diameter of the second plurality of fibers is greater than or equal to about 0.2 and less than or equal to about 0.8 microns.

72. The filter media of claim 64, wherein the second layer comprises a multi-layered structure.

73. The filter media of claim 64, wherein the second layer has an efficiency of greater than or equal to about 99% and less than or equal to about 99.99% for 4 micron or larger particles, as measured by a Multipass Filter Test following the ISO 19438 procedure at a BUGL of 50 mg/L, a face velocity of 0.06 cm/s, and a terminal pressure of 100 kPa.

74. The filter media of claim 64, wherein the filter media has an air permeability of greater than or equal to about 50 L/m² sec and less than or equal to about 500 L/m² sec.

75. The filter media of claim 64, wherein the third plurality of fibers has an average fiber diameter of greater than or equal to about 20 microns and less than or equal to about 50 microns.

76. The filter media of claim 64, wherein the third layer has an average weight percentage of cellulose fibers of greater than or equal to about 40 percent and less than or equal to about 100 percent.

77. The filter media of claim 64, wherein the third layer comprises a plurality of perforations, and wherein the perforations cover greater than or equal to about 5% and less than or equal to about 20% of the surface area of the third layer.

78. The filter media of claim 64, wherein the third layer has a Mullen Burst strength of greater than or equal to about 200 kPa and less than or equal to about 300 kPa.

79. The filter media of claim 64, wherein the third layer has an air permeability of greater than or equal to about 400 L/m² sec and less than or equal to about 700 L/m² sec.

80. The filter media of claim 64, wherein the first air permeability is higher than the second air permeability.

81. The filter media of claim 64, wherein the third air permeability is at least 20 times greater than the second air permeability and/or the first air permeability.

82. The filter media of claim 64 comprising a fourth layer, wherein the fourth layer is a spun-bond layer.

83. The filter media of claim 64, wherein the third layer has a pressure drop of less than or equal to about 30 Pa.

84. The filter media of claim 64, wherein the third layer comprises a plurality of perforations, and wherein the plurality of perforations have an average diameter of greater than or equal to about 0.5 mm and less than or equal to about 5 mm.

85. The filter media of claim 64, wherein the filter media is pleated.

86. A filter element comprising the filter media of claim 64, wherein the third layer is upstream of the first layer.

87. A filter element comprising the filter media of claim 64, wherein the third layer is downstream of the first layer.

88. The filter media of claim 64, wherein the third layer comprises a plurality of perforations, and wherein the average periodicity of the plurality of perforation is greater than or equal to about 5 mm and less than or equal to about 20 mm.

89. The filter media of claim 64, wherein the third layer comprises a plurality of perforations, and wherein the plurality of perforations have an average protrusion length of greater than or equal to about 1 mm and less than or equal to about 5 mm.

90. The filter media of claim 64, wherein the filter media has an average lifetime of greater than or equal to about 40 minutes and less than or equal to about 85 minutes as measured according to the standard ISO 4020.

91. The filter media of claim 82, wherein the fourth layer has an average thickness of less than or equal to about 0.3 mm.

92. The filter media of claim 64, wherein the first layer comprises at least three sub-layers.

93. The filter media of claim 64, wherein the first plurality of fibers comprises meltblown synthetic fibers.

94. The filter media of claim 64, wherein the first plurality of fibers has an average diameter of greater than or equal to 1 micron.

95. A filter element including the filter media of claim 64, wherein the filter element lacks a plastic or metallic net, wire, or mesh support structure.

96. A filter media, comprising:
a first layer comprising a first plurality of fibers, wherein the first layer has a first air permeability and a first mean flow pore size;
a second layer comprising a second plurality of fibers having an average fiber diameter of less than or equal to about 1 micron, wherein the second layer has a second air permeability and a second mean flow pore size; and
a third layer comprising a third plurality of fibers, wherein the third plurality of fibers comprises cellulose fibers, wherein the third layer has a third air permeability and a third mean flow pore size, and wherein the third layer comprises a plurality of perforations, and wherein the perforations cover greater than or equal to about 5% and less than or equal to about 20% of the surface area of the third layer,
wherein each of the first and third air permeabilities is higher than the second air permeability and/or wherein each of the first and third mean flow pore sizes is higher than the second mean flow pore size,
wherein the first layer, the second layer, and the third layer are discrete layers, and
wherein the second layer is positioned between the first and third layers.

97. A filter media, comprising:
a first layer comprising a first plurality of fibers, wherein the first layer has a first air permeability and a first mean flow pore size;
a second layer comprising a second plurality of fibers having an average fiber diameter of less than or equal to about 1 micron, wherein the second layer has a second air permeability and a second mean flow pore size; and
a third layer comprising a third plurality of fibers, wherein the third plurality of fibers comprises cellulose fibers, wherein the third layer has a third air permeability and a third mean flow pore size, and wherein the third layer comprises a plurality of perforations, and wherein the plurality of perforations have an average diameter of greater than or equal to about 0.5 mm and less than or equal to about 5 mm,
wherein each of the first and third air permeabilities is higher than the second air permeability and/or wherein each of the first and third mean flow pore sizes is higher than the second mean flow pore size,
wherein the first layer, the second layer, and the third layer are discrete layers, and wherein the second layer is positioned between the first and third layers.

98. A filter media, comprising:

a first layer comprising a first plurality of fibers, wherein the first layer has a first air permeability and a first mean flow pore size;

a second layer comprising a second plurality of fibers having an average fiber diameter of less than or equal to about 1 micron, wherein the second layer has a second air permeability and a second mean flow pore size; and a third layer comprising a third plurality of fibers, wherein the third plurality of fibers comprises cellulose fibers, wherein the third layer has a third air permeability and a third mean flow pore size, and wherein the third layer comprises a plurality of perforations, and wherein the plurality of perforations have an average protrusion length of greater than or equal to about 1 mm and less than or equal to about 5 mm, wherein each of the first and third air permeabilities is higher than the second air permeability and/or wherein each of the first and third mean flow pore sizes is higher than the second mean flow pore size, wherein the first layer, the second layer, and the third layer are discrete layers, and wherein the second layer is positioned between the first and third layers.

* * * * *